(12) United States Patent
Shimada et al.

(10) Patent No.: US 8,232,753 B2
(45) Date of Patent: Jul. 31, 2012

(54) CONTROL DEVICE FOR ELECTRIC MOTOR DRIVE APPARATUS

(75) Inventors: Arinori Shimada, Anjo (JP); Mitsuru Nakamura, Anjo (JP); Subrata Saha, Anjo (JP); Ken Iwatsuki, Anjo (JP)

(73) Assignee: Aisin AW Co., Ltd., Anjo (JP)

( * ) Notice: Subject to any disclaimer, the term of this patent is extended or adjusted under 35 U.S.C. 154(b) by 213 days.

(21) Appl. No.: 12/872,348

(22) Filed: Aug. 31, 2010

(65) Prior Publication Data

US 2011/0080125 A1 Apr. 7, 2011

(30) Foreign Application Priority Data

Oct. 2, 2009 (JP) .................................. 2009-231023

(51) Int. Cl.
*H02P 6/14* (2006.01)
(52) U.S. Cl. .............. 318/400.09; 318/700; 318/400.01; 318/400.02; 318/400.03; 318/400.04
(58) Field of Classification Search ............. 318/400.09, 318/400.01–400.05, 700
See application file for complete search history.

(56) References Cited

U.S. PATENT DOCUMENTS

| | | | | |
|---|---|---|---|---|
| 6,043,624 A | * | 3/2000 | Masaki et al. | ................ 318/723 |
| 2006/0049792 A1 | | 3/2006 | Chen et al. | |

FOREIGN PATENT DOCUMENTS

| | | |
|---|---|---|
| JP | A-06-078558 | 3/1994 |
| JP | A-2002-010677 | 1/2002 |
| JP | A-2002-272184 | 9/2002 |
| JP | A-2006-081287 | 3/2006 |
| JP | B2 3890907 | 3/2007 |
| JP | A-2007-159185 | 6/2007 |

OTHER PUBLICATIONS

Nov. 22, 2010 International Search Report issued in PCT/JP2010/064907 (with translation).

* cited by examiner

*Primary Examiner* — Walter Benson
*Assistant Examiner* — David Luo
(74) *Attorney, Agent, or Firm* — Oliff & Berridge, PLC

(57) ABSTRACT

A electric motor drive apparatus comprising a voltage control unit performing voltage control processing that determines alternating-current voltage command values serving as command values of the alternating-current voltages to be supplied to the alternating-current electric motor and generates switching control signals for the inverter; and a control mode selection unit selecting a synchronous control mode in which a cycle of electric angle of the alternating-current electric motor is synchronized with a switching cycle of the inverter, or an asynchronous control mode in which the cycles are not synchronized with each other. Current detection processing is performed to detect currents flowing in coils of the alternating-current electric motor in every standard calculation cycle that is set to a half of a cycle of the carrier.

6 Claims, 16 Drawing Sheets

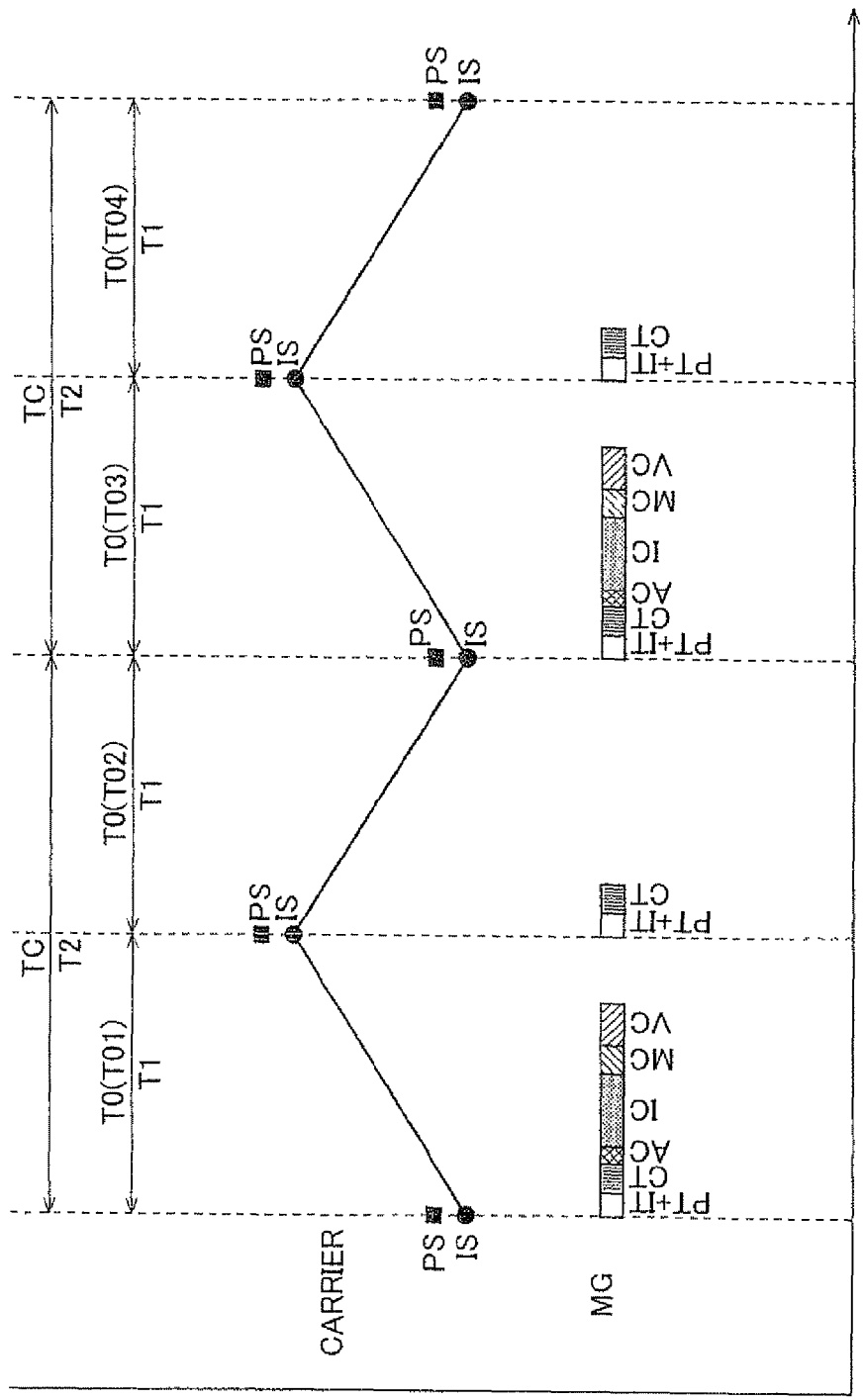

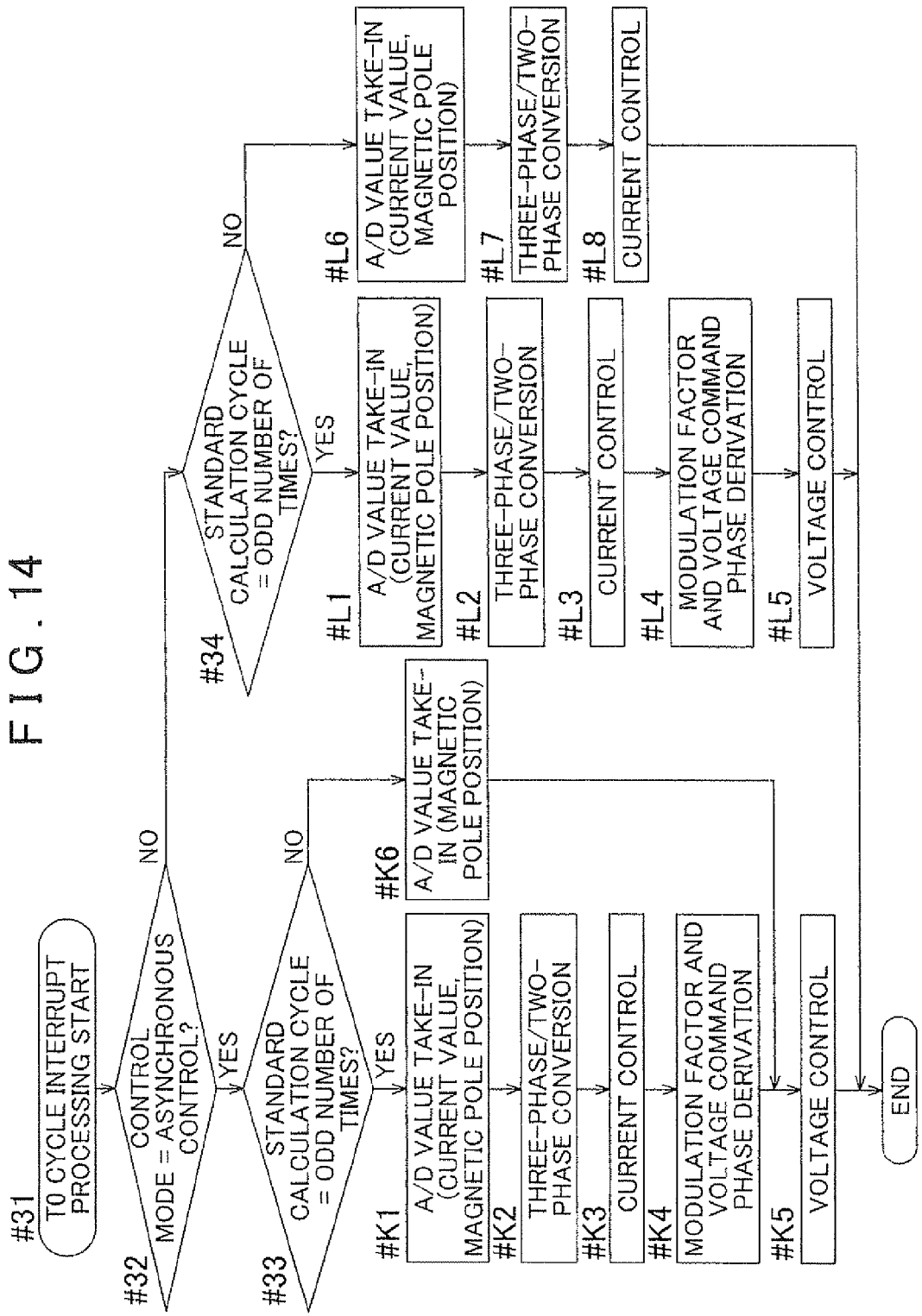

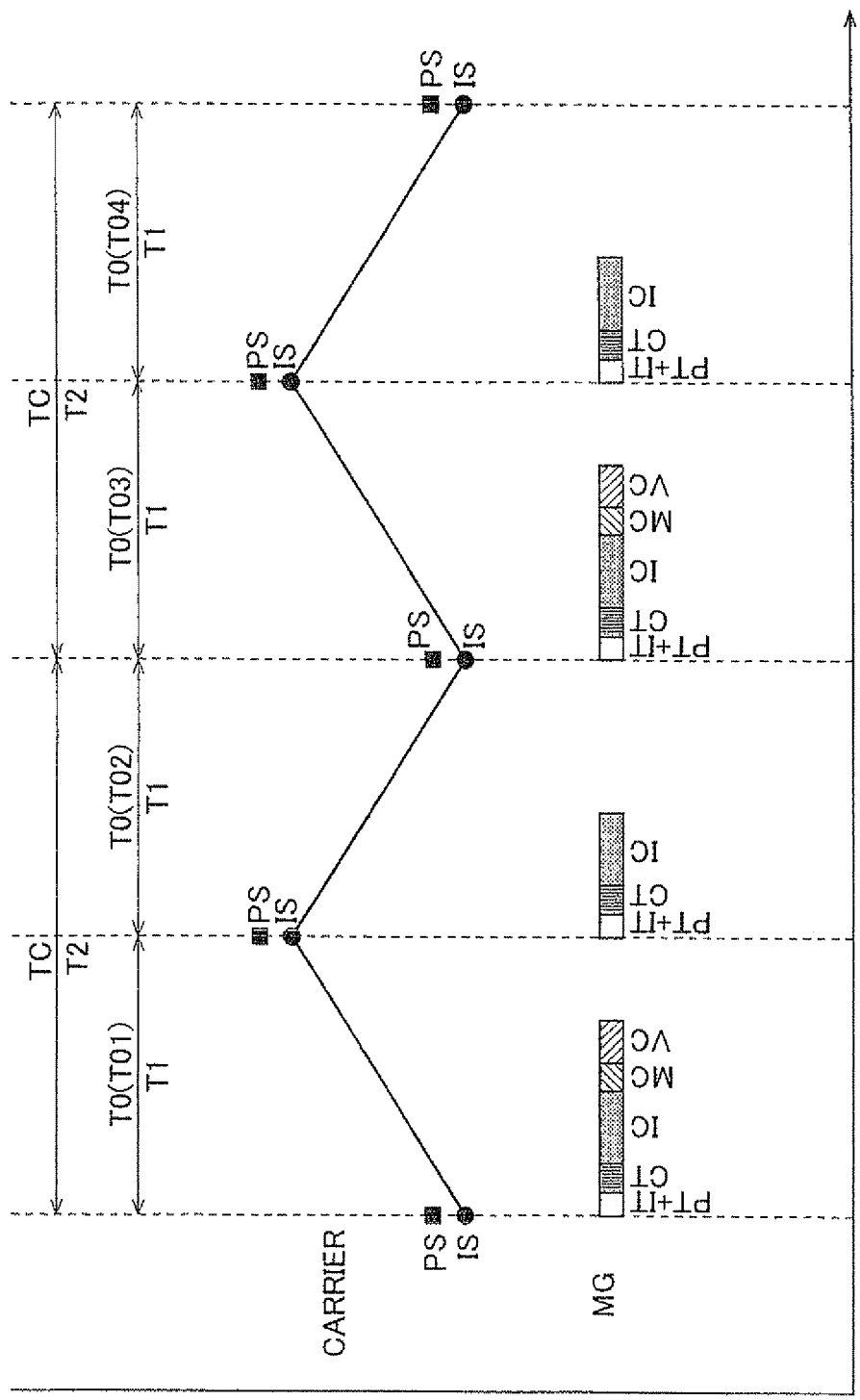

CONTROL DEVICE FOR ELECTRIC MOTOR DRIVE APPARATUS

INCORPORATION BY REFERENCE

The disclosure of Japanese Patent Application No. 2009-231023 filed on Oct. 2, 2009 including the specification, drawings and abstract is incorporated herein by reference in its entirety.

BACKGROUND OF THE INVENTION

The present invention relates to a control device that controls an electric motor drive apparatus having an inverter converting a direct-current voltage into alternating-current voltages and supplying the alternating-current voltages to an alternating-current electric motor, and controls the alternating-current electric motor by current feedback.

DESCRIPTION OF THE RELATED ART

A control device is already known to control an electric motor drive apparatus that has an inverter converting a direct-current voltage from a direct-current power supply into alternating-current voltages and supplying the alternating-current voltages to an alternating-current electric motor, and control the alternating-current electric motor using current feedback. Regarding the control device for an electric motor drive apparatus mentioned above, for example, Japanese Patent Publication No. 3890907 described below discloses a control device that performs current feedback control by using a vector control method, and generates alternating-current power from direct-current power by controlling an inverter using PWM (pulse width modulation) control to supply the alternating-current power to coils of corresponding phases of an electric motor, thus driving the electric motor. In the vector control, currents and voltages of a three-phase alternating current of U-phase, V-phase, and W-phase are used as currents and voltages of a two-phase direct current by converting the currents and the voltages of the three-phase alternating current into the rotating coordinate system of two axes, that is, a d-axis in the direction of a magnetic field of a permanent magnet arranged in a rotor and a q-axis perpendicular to the d-axis.

The control device disclosed in Japanese Patent Publication No. 3890907 first performs current control processing in which two-phase voltage command values vd'* and vq'* are derived based on externally given current command values id* and iq*, and actual current detection values id and iq flowing in the electric motor. Next, the control device derives two-phase voltage command values vd* and vq* in which interference terms are corrected by non-interference calculation. After that, a voltage control unit derives three-phase voltage command values vu*, vv*, and vw* based on the two-phase voltage command values vd* and vq*, and a magnetic pole position θre representing a rotational position of the rotor of the electric motor, and performs voltage control processing to generate a PWM signal by comparing a carrier (triangular wave) with the three-phase voltage command values vu*, vv*, and vw*. Then, the inverter is driven and controlled by the PWM signal so as to drive the electric motor by supplying the alternating-current power.

In addition, this control device is structured so as to be capable of performing the vector control of two electric motors in a common manner by using one calculation processing unit. One cycle of a PWM carrier is set as an interrupt cycle, and reading of the current detection values id and iq, the current control processing, and the voltage control processing are performed in a cycle of twice or an integer n times longer than the interrupt cycle. In this control device, an output of the PWM signal can be obtained for each interrupt cycle by calculating the three-phase voltage command values vu*, vv*, and vw* for two interrupt cycles by performing once the voltage control processing using the current detection values id and iq obtained by one detection.

SUMMARY OF THE INVENTION

In general, when a rotational speed of the electric motor is high compared with the cycle of the current detection processing, a problem of aliasing is apt to occur. That is, while the rotational speed of the electric motor is low, the problem of aliasing hardly occurs because the cycle (sampling cycle) of the current detection processing is sufficiently short compared with the cycle of a current ripple flowing in the coil. However, because the cycle of the current ripple flowing in the coil is close to the cycle of the current detection processing while the rotational speed of the electric motor is high, the low-frequency current ripple that is actually nonexistent may be falsely detected due to the aliasing of the current sampling. If the electric motor is controlled using the current feedback by performing the current control processing based on the current detection values that include the current ripples thus falsely detected, the control device generates voltage command values that include components for canceling the actually nonexistent current ripples. As a result, the low-frequency current ripples actually flow in the coils of the electric motor, providing a factor to generate a torque ripple in the electric motor.

On the other hand, the aliasing can be suppressed from occurring by reducing the cycle of the current detection processing in accordance with the high rotational speed of the electric motor, and accordingly reducing the cycle of the current control processing based on the current detection values. However, by such a countermeasure, a calculation load of the calculation processing unit of the control device accordingly increases. Therefore, because a conventional calculation processing unit has an insufficiency in processing capacity, a necessity arises for using a calculation processing unit with a higher processing capacity than before, providing a factor to increase the price and size of the device.

Therefore, it is desired to realize a control device for an electric motor drive apparatus that can suppress occurrence of abasing of current sampling even in the case of a high rotational speed of an electric motor while using a calculation processing unit with a limited processing capacity.

A control device for an electric motor drive apparatus according to a first aspect of the present invention that controls an electric motor drive apparatus having an inverter converting a direct-current voltage into alternating-current voltages and supplying the alternating-current voltages to an alternating-current electric motor, and controls the alternating-current electric motor by current feedback has a structure characterized by including a voltage control unit performing voltage control processing that determines alternating-current voltage command values serving as command values of the alternating-current voltages to be supplied to the alternating-current electric motor and generates switching control signals for the inverter, and a control mode selection unit selecting a synchronous control mode in which a cycle of electric angle of the alternating-current electric motor is synchronized with a switching cycle of the inverter, or an asynchronous control mode in which the cycles are not synchronized with each other, wherein current detection processing is performed to detect currents flowing in coils of the alternating-current electric motor in every standard calculation cycle that is set to a half of a cycle of the carrier, the voltage control processing is performed in a cycle of N times (where N is an integer of two or more) longer than the standard calculation cycle, and the voltage control processing is performed once by feeding back the current detection values for N times detected by repeating the current detection processing N times, if the synchronous control mode is selected.

When controlling the alternating-current electric motor, it is desirable from the point of view of efficiency and control response to select the synchronous control mode in which the cycle of electric angle of the alternating-current electric motor is synchronized with the switching cycle of the inverter while the rotational speed of the rotor is relatively high, and select the asynchronous control mode such as PWM control in which the cycle of electric angle of the alternating-current electric motor is not synchronized with the switching cycle of the inverter but the switching control signals for the inverter are generated based on the carrier while the rotational speed of the rotor is relatively low. Therefore, the selection of control mode as described above is frequently performed. Here, regarding the voltage control processing, in the PWM control included in the asynchronous control mode, the control device generates the alternating-current voltage command values corresponding to the magnetic pole position and performs a comparison operation with the carrier so as to generate the switching control signals, thereby switching the inverter basically in every carrier cycle. On the other hand, in the synchronous control mode, it is only necessary to derive an on/off switching phase of switching corresponding to the magnetic pole position and switch the inverter according to the on/off switching phase. Therefore, the necessity of performing the voltage control processing in a short cycle is reduced in the synchronous control mode than in the asynchronous control mode.

According to the first aspect, if the synchronous control mode is selected, the cycle (sampling cycle) of the current detection processing is shortened by performing the current detection processing in every standard calculation cycle that is set to a half of the carrier cycle in the state in which the rotational speed of the electric motor is relatively high and the frequency of the carrier is relatively close to the frequency of the alternating-current voltage command values. Accordingly, the aliasing of the current sampling can be suppressed from occurring. Consequently, the current ripples can be suppressed from flowing in the coils of the electric motor. Although the calculation load of the calculation processing unit increases by shortening the cycle of the current detection processing, the calculation load required for the voltage control processing is reduced by performing the voltage control processing in the cycle of N times longer than the standard calculation cycle, thereby enabling to limit the overall calculation load for controlling the electric motor drive apparatus and the alternating-current electric motor within the capacity of the calculation processing unit. Here, it is generally desirable to perform the voltage control processing in a short cycle because the voltage control processing generates the switching control signals for the inverter corresponding to the magnetic pole position of the alternating-current electric motor, which always varies. However, as described above, in the synchronous control mode, unlike in the asynchronous control mode, it is not necessary to switch the inverter in every carrier cycle. Therefore, the problem hardly occurs even if the cycle of the voltage control processing is extended. Accordingly, even if the rotational speed of the electric motor is high, the aliasing of the current sampling can be suppressed from occurring while using a calculation processing unit with a limited processing capacity.

According to a second aspect of the present invention, the voltage control processing may be performed in each of the standard calculation cycles, and the current detection processing may be performed in the cycle of N times longer than the standard calculation cycle, and the voltage control processing may be performed N times by feeding back the current detection values detected by performing the current detection processing once, if the asynchronous control mode is selected.

According to the second aspect, if the asynchronous control mode is selected, it is possible to perform the voltage control processing in the asynchronous control mode appropriately in a short cycle in which the control signals for switching on or off are output basically in every carrier cycle as described above, by performing the voltage control processing in every standard calculation cycle that is set to a half of the carrier cycle. Contrary to the case in which the synchronous control mode is selected, the calculation load of the calculation processing unit increases by shortening the cycle of the voltage control processing. However, by performing the current detection processing in the cycle of N times longer than the standard calculation cycle, the calculation load required for the current detection processing and the calculation processing associated therewith is reduced, thereby enabling to limit the overall calculation load for controlling the electric motor drive apparatus and the alternating-current electric motor within the processing capacity of the calculation processing unit. In this case, because the asynchronous control mode is selected in the case in which the rotational speed of the electric motor is relatively low and the frequency of the carrier is sufficiently higher than the frequency of the alternating-current voltage command values, the aliasing of the current sampling hardly occurs even if the cycle (sampling cycle) of the current detection processing based on the carrier cycle is longer to some extent than the carrier cycle. Therefore, no problem occurs even if the frequency of the current detection processing is reduced. Accordingly, even if the rotational speed of the electric motor is high, the aliasing of the current sampling can be suppressed from occurring while using a calculation processing unit with a limited processing capacity.

According to a third aspect of the present invention, the control device may further include a current control unit performing current control processing that determines first voltage command values based on deviations between current command values determined based on a required torque of the alternating-current electric motor and the current detection values detected by the current detection processing, and an average value calculation unit performing average value calculation that calculates average values of the current detection values for N times detected by repeating the current detection processing N times, wherein the average value calculation and the current control processing, as well as the voltage control processing, are performed in the cycle of N times longer than the standard calculation cycle, if the synchronous control mode is selected, and the current control unit determines the first voltage command values by performing the current control processing based on deviations between the current command values and the average values calculated by the average value calculation unit, and the voltage control unit performs the voltage control processing based on the first voltage command value.

According to the third aspect, if the synchronous control mode is selected, the average values of the current detection values for N times obtained as a result of the current detection processing performed in every standard calculation cycle are calculated, and by using the average values, the current control processing and the voltage control processing are performed in the cycle of N times longer than the standard calculation cycle. Accordingly, in the case of performing the current control processing and the voltage control processing in a relatively long cycle of N times longer than the standard calculation cycle while performing the current detection processing in a short cycle of the standard calculation cycle, the current control processing and the voltage control processing can be performed by appropriately feeding back the current detection values for N times detected by repeating the current detection processing N times. Consequently, the aliasing of the current sampling can be suppressed from occurring by appropriately reflecting the current detection values detected in the short cycle while limiting the overall calculation load for controlling the electric motor drive apparatus and the alternating-current electric motor within the processing capacity of the calculation processing unit.

According to a fourth aspect of the present invention, the control device may further include a current control unit performing current control processing that determines first voltage command values at least by performing proportional control and integral control based on deviations between current command values determined based on a required torque of the alternating-current electric motor and the current detection values detected by the current detection processing, wherein the current control processing, as well as the current detection processing, is performed in each of the standard calculation cycles, if the synchronous control mode is selected, and the voltage control unit performs the voltage control processing based on the first voltage command values having integral terms to which the current detection values for N times are reflected by the current control processing repeated N times.

According to the fourth aspect, if the synchronous control mode is selected, the current detection processing and the current control processing are performed in every standard calculation cycle, and the voltage control processing is performed in the cycle of N times longer than the standard calculation cycle. In this case, because of the current detection processing and the current control processing performed in every standard calculation cycle, the current control processing calculates the first voltage command values having the integral terms in which the current detection values for N times are reflected. Accordingly, in the case of performing the voltage control processing in a relatively long cycle of N times longer than the standard calculation cycle while performing the current detection processing in a short cycle of the standard calculation cycle, the voltage control processing can be performed by appropriately feeding back the current detection values for N times detected by repeating the current detection processing N times. Consequently, the aliasing of the current sampling can be suppressed from occurring by appropriately reflecting the current detection values detected in the short cycle while limiting the overall calculation load for controlling the electric motor drive apparatus and the alternating-current electric motor within the processing capacity of the calculation processing unit.

According to a fifth aspect of the present invention, the calculation processing for the current feedback control of N pieces of the alternating-current electric motors may be performed by a single calculation processing unit, and the current detection processing for each of the N alternating-current electric motors may be performed in each of the standard calculation cycles, and the voltage control processing for each of the N alternating-current electric motors may be performed in the cycle of N times longer than the standard calculation cycle in the mutually different standard calculation cycles, if the synchronous control mode is selected.

According to the fifth aspect, if the synchronous control mode is selected, the cycle (sampling cycle) of the current detection processing can be shortened by performing the current detection processing for each of the alternating-current electric motors in every standard calculation cycle so as to suppress the occurrence of the aliasing of the current sampling, even when the calculation processing for the current feedback control of the N alternating-current electric motors is performed by the single calculation processing unit. The calculation load of the calculation processing unit increases by shortening the cycle of the current detection processing. However, by performing the voltage control processing for each of the alternating-current electric motors in the cycle of N times longer than the standard calculation cycle in the standard calculation cycle different from the standard calculation cycle in which the voltage control processing for other alternating-current electric motors is performed, a bias in the calculation load among the standard calculation cycles is suppressed while appropriately performing the voltage control processing for each of the N alternating-current electric motors in a predetermined cycle, thus enabling to reduce the calculation load required for the voltage control processing. Consequently, the overall calculation load for controlling the electric motor drive apparatus and the alternating-current electric motor can be limited within the processing capacity of the calculation processing unit. Accordingly, even if the rotational speed of the electric motor is high, the aliasing of the current sampling can be suppressed from occurring while appropriately controlling the N alternating-current electric motors by using a calculation processing unit with a limited processing capacity.

According to a sixth aspect of the present invention, the voltage control processing for each of the N alternating-current electric motors may be performed in each of the standard calculation cycles sequentially in the same standard calculation cycle, and the current detection processing for each of the N alternating-current electric motors may be performed in the cycle of N times longer than the standard calculation cycle at mutually different times, and the voltage control processing may be performed N times by feeding back the current detection values detected by performing the current detection processing once for each of the N alternating-current electric motors, if the asynchronous control mode is selected.

According to the sixth aspect, if the asynchronous control mode is selected, the voltage control processing in the asynchronous control mode for each of the N alternating-current electric motors can be appropriately performed in a short cycle by performing the voltage control processing for each of the alternating-current electric motors in every standard calculation cycle sequentially in the same standard calculation cycle, even when the calculation processing for the current feedback control of the N alternating-current electric motors is performed by the single calculation processing unit. Contrary to the case in which the synchronous control mode is selected, the calculation load of the calculation processing unit increases by shortening the cycle of the voltage control processing for each of the alternating-current electric motors. However, by performing the current detection processing for each of the alternating-current electric motors in the cycle of N times longer than the standard calculation cycle at different time from time at which the current detection processing for other alternating-current electric motors is performed, a bias in the calculation load between each of the standard calculation cycles is suppressed while appropriately performing the current detection processing for each of the N alternating-current electric motors in a predetermined cycle, thus enabling to reduce the calculation load required for the current detection processing and the calculation processing associated therewith. Consequently, the overall calculation load for controlling the electric motor drive apparatus and the alternating-current electric motor can be limited within the processing capacity of the calculation processing unit. Accordingly, even if the rotational speed of the electric motor is high, the aliasing of the current sampling can be suppressed from occurring while appropriately controlling the N alternating-current electric motors by using a calculation processing unit with a limited processing capacity.

BRIEF DESCRIPTION OF THE DRAWINGS

FIG. 11 is a time chart in the case of control in a synchronous control mode according to the second embodiment;

FIG. 14 is a flow chart showing procedures of electric motor control processing according to a fourth embodiment; and FIG. 15 is a time chart in the case of control in a synchronous control mode according to the fourth embodiment.

DETAILED DESCRIPTION OF THE EMBODIMENTS

1. First Embodiment

Figure 1:
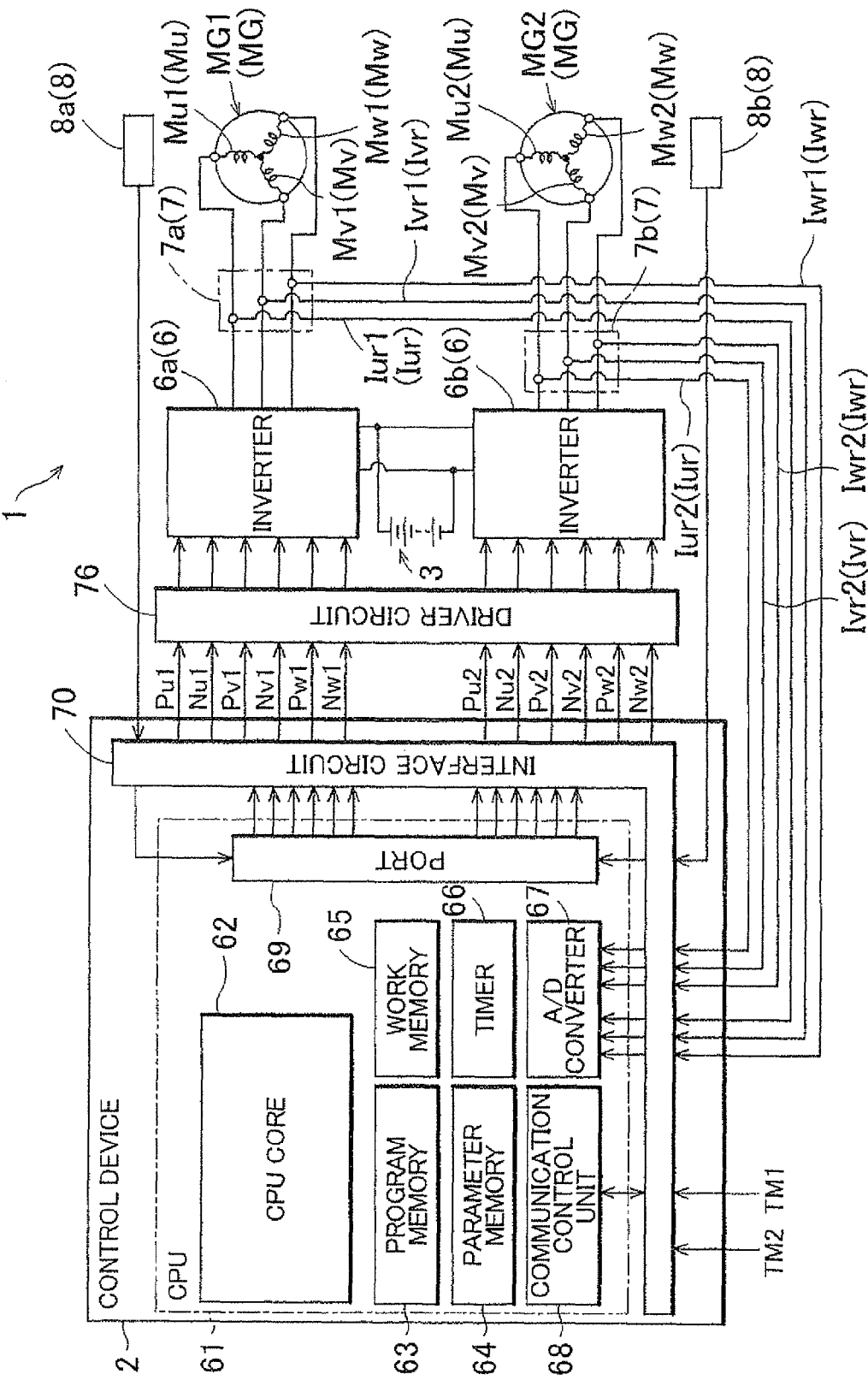
FIG. 1 is a block diagram schematically showing an example of a system structure of a vehicle including a control device according to a first embodiment.

A first embodiment of a control device 2 of an electric motor drive apparatus 1 according to the present invention will be described with reference to the accompanying drawings. As shown in FIG. 1, in the present embodiment, an example will be described in which the electric motor drive apparatus 1 is structured as an apparatus to drive and control two synchronous electric motors MG1 and MG2 (IPMSM, hereinafter may be collectively referred simply to as "electric motors MG") of an internal magnet structure serving as alternating-current electric motors operated by three-phase alternating current. The electric motors MG are structured so as to operate also as generators as required. The electric motors MG are used, for example, as a source of driving force of an electric vehicle or a hybrid vehicle. The electric motor drive apparatus 1 is structured to have inverters 6 that convert a direct-current voltage Vdc into alternating-current voltages and supply them to the electric motors MG. In the present embodiment, as shown in FIG. 2, the control device 2 controls the electric motor drive apparatus 1 to control the electric motors MG by current feedback using a vector control method.

Figure 2:
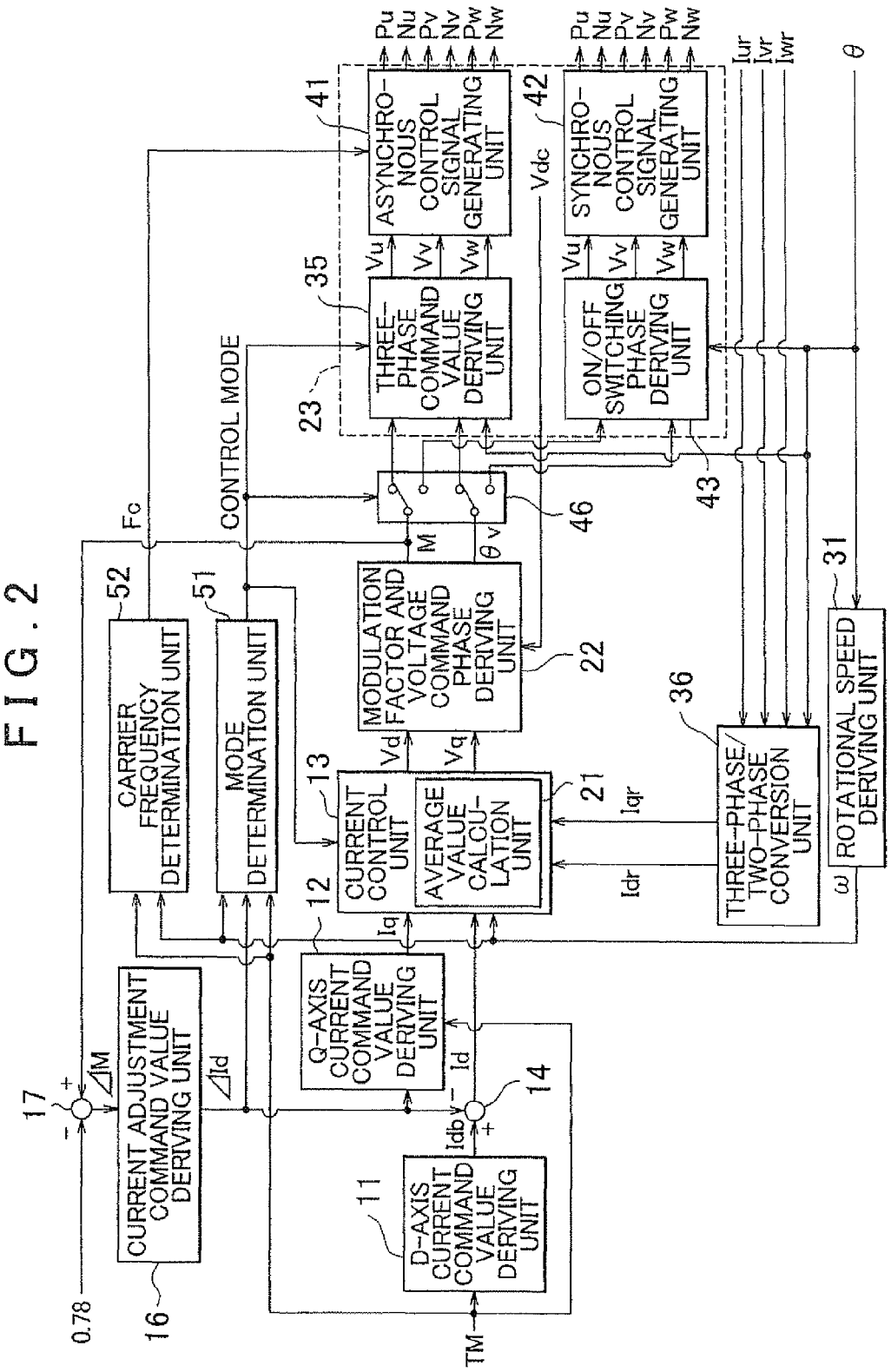
FIG. 2 is a functional block diagram of the control device according to the first embodiment.

In the structure described above, the control device 2 according to the present embodiment is provided with a voltage control unit 23 that determines alternating-current voltage command values Vu, Vv, and Vw serving as command values of the alternating-current voltages supplied to the electric motors MG, and performs voltage control processing for generating switching control signals Pu, Nu, Pv, Nv, Pw, and Nw for the inverter 6 (refer to FIG. 2). The electric motor drive apparatus 1 is provided with two selectable modes of a synchronous control mode in which a cycle of electric angle of the electric motors MG is synchronized with a switching cycle of the inverter 6, and an asynchronous control mode in which those cycles are not synchronized with each other. The electric motor drive apparatus 1 is characterized by performing, if the synchronous control mode is selected, current detection processing to detect a current flowing in a coil of the electric motor MG in every standard calculation cycle that is set to a half of a cycle of a carrier, also performing the voltage control processing in a cycle of N times (where N is an integer of two or more) longer than the standard calculation cycle, and thus performing the voltage control processing once by feeding back the current detection values for N times detected by repeating the current detection processing N times (refer to FIG. 8). Consequently, the electric motor drive apparatus 1 is realized in which aliasing in current sampling can be suppressed from occurring while using a calculation processing unit with a limited processing capacity, even if a rotational speed of the electric motor MG is high. Note that, in the present embodiment, description will be made of an example in which the value of "N" mentioned above is 2. The electric motor drive apparatus 1 and the control device 2 according to the present embodiment will be described below in detail.

1-1. Hardware Structure of Electric Motor Drive Apparatus and Control Device

First, the hardware structure of the electric motor drive apparatus 1 and the control device 2 according to the present embodiment will be described based on FIG. 1. As shown in FIG. 1, in the present embodiment, two three-phase synchronous electric motors of a first electric motor MG1 and a second electric motor MG2 are provided as controlled objects. The first electric motor MG1 and the second electric motor MG2 may be either electric motors of the same performance or those of different performances. The electric motors MG1 and MG2 are connected to a direct-current power supply 3 generating the direct-current voltage Vdc via inverters 6a and 6b (hereinafter may be collectively referred simply to as "inverters 6"), respectively. As the direct-current power supply 3, any of various secondary batteries such as a nickel metal hydride secondary battery and a lithium ion secondary battery, a capacitor, or a combination thereof is used. The direct-current voltage Vde that is a voltage of the direct-current power supply 3 is detected by a voltage sensor (not shown) to be supplied to the control device 2. It is also preferable to have a structure provided with smoothing capacitors for smoothing the direct-current voltage Vdc from the direct-current power supply 3 or converters for raising the direct-current voltage Vdc from the direct-current power supply 3 interposed between the direct-current power supply 3 and the inverters 6.

The inverters 6 convert the direct-current voltage Vdc from the direct-current power supply 3 into the three-phase alternating voltages and supply them to the electric motors MG. The three-phase alternating voltages thus supplied drive the electric motors MG. That is, the inverters 6 serve as DC/AC conversion units. Each of the inverters 6 is structured to have a plurality of switching elements (not shown). It is suitable to apply, for example, an IGBT (insulated gate bipolar transistor) or a MOSFET (metal oxide semiconductor field effect transistor) to the switching element. Description will be made below of an example in which the IGBT is used as the switching element.

The inverters 6 (6a and 6b) are formed of a three-phase bridge circuit. Two of the IGBTs are connected in series between a positive input side and a negative input side of the inverters 6, and three of these series circuits are connected in parallel. That is, the bridge circuit is structured such that one set of the series circuit corresponds to each of stator coils Mu (Mu1 and Mu2), Mv (Mv1 and Mv2), and Mw (Mw1 and Mw2) corresponding to a u-phase, a v-phase, and a w-phase of the electric motors MG (MG1 and MG2). A collector of the IGBT on the upper side of each phase is connected to the positive input side of the inverters 6, and an emitter is connected to a collector of the IGBT on the lower side. An emitter of the IGBT on the lower side of each phase is connected to the negative input side (such as ground) of the inverters 6. Middle points of the series circuits formed by a pair of IGBTs of each phase, that is, the connection point between the IGBTs is connected to the corresponding one of the stator coils Mu, Mv, and Mw of the electric motors MG.

A free-wheel diode (regenerative diode) is connected in parallel with each of the IGBTs. The free-wheel diode is connected in parallel with the IGBT in a manner in which a cathode terminal is connected to the collector terminal of the IGBT, and an anode terminal is connected to the emitter terminal of the IGBT. A gate of each of the IGBTs is connected to the control device 2 via a driver circuit 76, and individually switching-controlled.

The control device 2 controls the plurality (two here) of inverters 6 (6a and 6b) provided in the electric motor drive apparatus 1. The control device 2 is structured as ECU (electronic control unit) composed of a microcomputer or other logic circuit as a core. In the present embodiment, the control device 2 is structured to have a CPU (central processing unit) 61 that is a single-task microcomputer, an interface circuit 70, and other peripheral circuitry. The CPU 61 is a computer that executes electric motor control processing to be described later. The interface circuit 70 is composed of EMI (electromagnetic interference) prevention components, a buffer circuit, and others. The switching control signals that are driving signals input to the gates of the IGBTs or the MOSFETs serving as switching elements for switching high voltage require a higher voltage than a driving voltage of a general electronic circuit such as a microcomputer. Therefore, the switching control signals are raised to a higher voltage level via the driver circuit 76, and then input to the inverters 6.

The CPU 61 is structured to have at least a CPU core 62, a program memory 63, a parameter memory 64, a work memory 65, a timer 66, an A/D converter 67, a communication control unit 68, and ports 69. The CPU core 62 is a core of the CPU 61, and structured to have an instruction register and an instruction decoder, an ALU (arithmetic logic unit) serving as a main unit for various calculations, flag registers, general registers, an interrupt controller, and others. In the present embodiment, the CPU 61 is provided with the single CPU core 62 that corresponds to a "single calculation processing unit" in the present invention. The CPU core 62 serves as a core of the single-task computer executing a program in a serial manner.

The program memory 63 is a non-volatile memory in which an electric motor control program is stored. The parameter memory 64 is a non-volatile memory in which various parameters are stored to be referred to when executing the program. The parameter memory 64 may be built without distinction from the program memory 63. The program memory 63 and the parameter memory 64 are suitably structured, for example, with a flash memory or the like. The work memory 65 is a memory that temporarily stores temporary data while executing the program. The work memory 65 that may be volatile is structured with a DRAM (dynamic RAM) or a SRAM (static RAM) that can be read and written at a high speed.

The timer 66 measures time on the basis of a predetermined clock cycle. The timer 66 monitors the execution cycle of the program assuming as a standard calculation cycle T0, for example, a half of the carrier cycle of the switching control signals to be described later, and notifies the interrupt controller of the CPU core 62 of the execution cycle. The A/D converter 67 converts analog electrical signals into digital data. In the present embodiment, the A/D converter 67 receives current detection values Iur (Iur1 and Iur2), Ivr (Ivr1 and Ivr2), and Iwr (Iwr1 and Iwr2) that are detection values of currents flowing in the stator coils Mu, Mv, and Mw of the electric motors MG from current sensors 7 (7a and 7b), and converts the current detection values into digital data. It should be noted that, because the three phases of the u-phase, the v-phase, and the w-phase are balanced so as to have an instantaneous value of zero, the currents of only two phases may be detected, and the current of the remaining one phase may be obtained through calculation by the CPU 61. The present embodiment exemplifies a case in which all of the three phases are detected. Note that, in the case of detecting the currents of only two phases and obtaining the remaining one phase by calculation in the CPU 61, the A/D converter 67 is sufficient to have only four analog inputs.

The communication control unit 68 controls communication with other systems in a vehicle. In the present embodiment, the communication control unit 68 controls communication with a travel control system, sensors, and others via a CAN (controller area network) (not shown) in the vehicle. For example, the CPU 61 receives motor control commands including required torques TM for the electric motors MG from the travel control system via the communication control unit 68, and controls the electric motors MG based on the received commands. In the present embodiment, the CPU 61 receives a required torque TM1 for the first electric motor MG1 and a required torque TM2 for the second electric motor MG2 (hereinafter may be collectively referred simply to as "required torques TM"). The CPU 61 is also suitably structured to be connected to a brake system or a power steering system via the communication control unit 68 to control these systems.

The ports 69 serve as a terminal control unit that outputs the switching control signals and others of the inverters 6 via terminals of the CPU 61, and receives rotation detection signals input to the CPU 61 form rotation sensors 8 (8a and 8b). In FIG. 1, a reference symbol P* of a signal input from the interface circuit 70 into the driver circuit 76 represents the control signal of the IGBT on the upper side of the inverters 6, and a reference symbol N* represents a control signal of the IGBT on the lower side. Reference symbols *u, *v, and *w represent the control signals of the IGBTs of the u-phase, the v-phase, and the w-phase, respectively, of the inverters 6. Reference symbols *1 and *2 represent the IGBT control signals as switching control signals of the inverter 6a of the first electric motor MG1 and the inverter 6b of the second electric motor MG2, respectively. The rotation sensors 8 are sensors each of which is provided near each of the electric motors MG to detect a magnetic pole position θ indicating a rotational angle of a rotor of the electric motor MG, and structured, for example, using a resolver. Here, the magnetic pole position θ is assumed to represent the rotational angle of the rotor as an electric angle.

As described above, the electric motor drive apparatus 1 according to the present embodiment controls the two electric motors MG1 and MG2, and has the two inverters 6a and 6b corresponding to the two electric motors MG1 and MG2, respectively. The control device 2 is structured so as to control the two electric motors MG1 and MG2 by controlling the two inverters 6a and 6b. In this case, the control device 2 is structured so as to control the two inverters 6a and 6b by using the CPU core 62 serving as the single calculation processing unit.

1-2. Software Structure of Control Device

Next, the software structure of the control device 2 will be described. It should be noted that, in the present embodiment, the electric motor drive apparatus 1 drive-controls the two electric motors MG1 and MG2, and has the two inverters 6a and 6b corresponding to the electric motors MG1 and MG2, respectively. In correspondence to this, the control device 2 is provided with functional units each of which corresponds to each of the two inverters 6a and 6b, and each of the two electric motors MG1 and MG2. However, because the structure is the same, only the functional unit that controls one of the inverters 6 and one of the electric motors MG will be described below. As shown in FIG. 2, the control device 2 controls the electric motor drive apparatus 1 provided with the electric motor MG and the inverter 6 by current feedback control using the vector control method. In the vector control, the current feedback control is performed by converting through coordinate transformation the coil current flowing in each of the stator coils of three phases of the alternating-current electric motor MG into two-phase vector components on a d-axis in the direction of a magnetic field generated by a permanent magnet arranged in the rotor and on a q-axis perpendicular to the d-axis.

When performing the coordinate transformation in the vector control, the rotational state of the electric motor MG must always be detected. Accordingly, in the present embodiment, as shown in FIG. 1, the rotational sensor 8 such as a resolver is provided near the electric motor MG. The magnetic pole position θ as a result of the detection is input to the control device 2. As described above, the magnetic pole position θ is an electric angle. The required torque TM is also input to the control device 2. Then, depending on the required torque TM, the magnetic pole position θ, and a rotational speed ω of the electric motor MG derived from the magnetic pole position θ, the control device 2 generates and outputs the control signals Pu, Nu, Pv, Nv, Pw, and Nw for driving the electric motor MG to drive-control the inverter 6. The control signals Pu, Nu, Pv, Nv, Pw, and Nw are switching control signals for causing the switching elements of the inverter 6 to perform switching operation in accordance with one of a plurality of control modes to be described later, and specifically, gate drive signals for driving the gates of the switching elements.

The required torque TM is input to a d-axis current command value deriving unit 11. The d-axis current command value deriving unit 11 derives a basic d-axis current command value Idb based on the input required torque TM. Here, the basic d-axis current command value Idb corresponds to a command value of a d-axis current when maximum torque control is performed. Note that the maximum torque control is control to adjust a current phase so as to maximize an output torque of the electric motor MG for the same current. In the present embodiment, the d-axis current command value deriving unit 11 is structured to use a table specifying a relation between the value of the required torque TM and the basic d-axis current command value so as to derive the basic d-axis current command value Idb corresponding to the value of the required torque TM. The basic d-axis current command value Idb thus derived is input to a subtractor 14. A d-axis current adjustment command value ΔId derived by a current adjustment command value deriving unit 16 to be described later is also input to the subtractor 14. The subtractor 14 subtracts the d-axis current adjustment command value ΔId from the basic d-axis current command value Idb to derive an eventual d-axis current command value Id as shown in a formula (1) below.

$$Id = Idb - \Delta Id \qquad (1)$$

The required torque TM and the d-axis current adjustment command value ΔId are input to a q-axis current command value deriving unit 12. The q-axis current command value deriving unit 12 derives a q-axis current command value Iq based on the required torque TM and the d-axis current adjustment command value ΔId thus input. In the present embodiment, the q-axis current command value deriving unit 12 uses at least a table specifying a relation between the value of the required torque TM and the d-axis current adjustment command value ΔId so as to derive the q-axis current command value Iq corresponding to the required torque TM and the d-axis current adjustment command value ΔId. The d-axis current command value Id and the q-axis current command value Iq thus derived are command values of the two-phase current having the mutually perpendicular vector components for driving the electric motor MG. Accordingly, in the present embodiment, the d-axis current command value Id and the q-axis current command value Iq correspond to "current command values" in the present invention.

The d-axis current command value Id and the q-axis current command value Iq are input to a current control unit 13. In addition, a d-axis current detection value Idr and a q-axis current detection value Iqr are input from a three-phase/two-phase conversion unit 36, and the rotational speed ω of the electric motor MG is also input from a rotational speed deriving unit 31 to the current control unit 13. The three-phase/two-phase conversion unit 36 performs three-phase/two-phase conversion to derive the d-axis current detection value Idr and the q-axis current detection value Iqr based on the current detection values (three-phase current detection values: the u-phase current detection value Iur, the v-phase current detection value Ivr, and the w-phase current detection value Iwr) detected by the current sensor 7 (refer to FIG. 1) detecting the currents actually flowing in the stator coils (Mu, Mv, and Mw) of the electric motor MG, and the magnetic pole position 9 detected by the rotation sensor 8 (refer to FIG. 1). The rotational speed deriving unit 31 derives the rotational speed ω of the electric motor MG based on the magnetic pole position θ detected by the rotation sensor 8 (refer to FIG. 1).

The current control unit 13 performs current control processing that determines two-phase voltage command values Vd and Vq serving as first voltage command values based on deviations between the two-phase current command values that are the d-axis current command value Id and the q-axis current command value Iq and the two-phase current detection values (d-axis current detection value Idr and q-axis current detection value Iqr) obtained by applying the three-phase/two-phase conversion to the current detection values Iur, Ivr, and Iwr. In this case, the current control unit 13 determines the two-phase voltage command values Vd and Vq at least by performing proportional control and integral control based on the deviations. Specifically, the current control unit 13 derives a d-axis current deviation δId that is a deviation between the d-axis current command value Id and the d-axis current detection value Idr, and a q-axis current deviation δId that is a deviation between the q-axis current command value Iq and the q-axis current detection value Iqr. Then, the current control unit 13 derives a basic d-axis voltage command value Vzd by performing a proportional-integral control calculation (PI control calculation) based on the d-axis current deviation δId, and also derives a basic q-axis voltage command value Vzq by performing the proportional-integral control calculation based on the q-axis current deviation δIq. Note that it is also preferable to perform proportional-integral-derivative control calculations (PID control calculations) instead of the proportional-integral control calculations.

Then, the current control unit 13 derives the d-axis voltage command value Vd by performing an adjustment of subtracting a q-axis armature reaction Eq from the basic d-axis voltage command value Vzd, as shown in a formula (2) below.

$$Vd = Vzd - Eq \quad (2)$$
$$= Vzd - \omega \cdot Lq \cdot Iqr$$

As shown in the formula (2), the q-axis armature reaction Eq is derived based on the rotational speed ω of the electric motor MG, the q-axis current detection value Iqr, and a q-axis inductance Lq.

Moreover, the current control unit 13 derives the q-axis voltage command value Vq by performing an adjustment of adding a d-axis armature reaction Ed and an induced voltage Em generated by an armature interlinkage magnetic flux of the permanent magnet to the basic q-axis voltage command value Vzq, as shown in a formula (3) below.

$$Vq = Vzq + Ed + Em \quad (3)$$
$$= Vzq + \omega \cdot Ld \cdot Idr + \omega \cdot MIf$$

As shown in the formula (3), the d-axis armature reaction Ed is derived based on the rotational speed ω of the electric motor MG, the d-axis current detection value Idr, and a d-axis inductance Ld. In addition, the induced voltage Em is derived based on an induced voltage constant MIf determined by an effective value of the armature interlinkage magnetic flux of the permanent magnet and on the rotational speed ω of the electric motor MG In the present embodiment, the current control unit 13 is also provided with an average value calculation unit 21. The average value calculation unit 21 performs an average value calculation to calculate average values of the detection values for two (=N) times detected by repeating the current detection processing twice (=N times). Here, the average value calculation unit 21 receives, as input values, the two-phase current detection values (d-axis current detection value Idr and q-axis current detection value Iqr) obtained by applying the three-phase/two-phase conversion by using the three-phase/two-phase conversion unit 36 to the three-phase current detection values Iur, Ivr, and Iwr detected by the current sensor 7. Then, the average value calculation unit 21 calculates average values of the input values for the two times, that is, an average value of the d-axis current detection values Idr for two times and an average value of the q-axis current detection values Iqr for the two times. As will be described later, the average value calculation unit 21 functions if a mode determination unit 51 has selected the synchronous control mode, but does not function if the mode determination unit 51 has selected the asynchronous control mode. Therefore, the information on the control mode selected by the mode determination unit 51 is input to the current control unit 13, and, depending on the information, the current control unit 13 determines whether or not the average value calculation unit 21 is to perform the average value calculation. Then, if the average value calculation unit 21 has performed the average value calculation, the current control unit 13 determines the two-phase voltage command values Vd and Vq by performing the current control processing based on deviations between the average values of the two-phase current command values (d-axis current command value Id and q-axis current command value Iq) and the average values of the corresponding two-phase current detection values (d-axis current detection value Idr and q-axis current detection value Iqr) calculated by the average value calculation unit 21.

The d-axis voltage command value Vd and the q-axis voltage command value Vq are input to a modulation factor and voltage command phase deriving unit 22. The direct-current voltage Vdc detected by the voltage sensor (not shown) is also input to the modulation factor and voltage command phase deriving unit 22. Based on the input d-axis voltage command value Vd and the q-axis voltage command value Vq, and on the direct-current voltage Vdc, which are input as described above, the modulation factor and voltage command phase deriving unit 22 derives a modulation factor M and a voltage command phase θv as second voltage command values. Here, the modulation factor M represents a ratio of an effective value of a fundamental wave component of an output voltage waveform of the inverter 6 to the direct-current voltage Vdc. In the example of the present embodiment, the modulation ratio M is derived as a ratio of an effective value of the two-phase voltage command values Vd and Vq to the direct-current voltage Vdc. Specifically, the modulation factor M is calculated according to a formula (4) given below.

$$M = \sqrt{(Vd^2 + Vq^2)}/Vdc \quad (4)$$

The voltage command phase θv is a phase angle of a voltage vector represented by the two-phase voltage command values Vd and Vq, and corresponds to an angle formed by a resultant voltage vector generated by combining a d-axis voltage vector with respect to the d-axis voltage command value Vd with a q-axis voltage vector with respect to the q-axis voltage command value Vq, and by the d-axis voltage vector with respect to the d-axis voltage command value Vd. In the example of the present embodiment, the voltage command phase θv is calculated according to a formula (5) given below.

$$\theta v = \tan^{-1}(Vq/Vd) \quad (5)$$

The voltage command phase θv corresponds to a phase of an origin of the u-phase voltage command value Vu with reference to an origin (θ=0°) of the magnetic pole position θ.

It should be noted that, in the electric motor MG, as the rotational speed ω increases, the induced voltage increases, and an alternating-current voltage (hereinafter referred to as "required voltage") required to drive the electric motor MG also increases. Then, when the required voltage exceeds a maximum alternating-current voltage (hereinafter referred to as "maximum output voltage") capable of being output from the inverter 6 by converting the direct-current voltage Vdc at that time, necessary currents for the stator coils cannot flow, thereby being unable to control the electric motor MG appropriately. For that reason, the control device 2 is structured so as to perform so-called field-weakening control that adjusts the current phase (ahead of that of the maximum torque control) so that a magnetic flux in the direction of weakening a field flux of the electric motor MG is generated from the stator coil. Therefore, in the present embodiment, the control device 2 is structured such that the d-axis current adjustment command value ΔId is derived based on the modulation factor M derived by the modulation factor and voltage command phase deriving unit 22, and based on the d-axis current adjustment command value ΔId thus derived, the basic d-axis current command value Idb and the q-axis current command value Iq are adjusted.

More specifically, the modulation factor M and a value "0.78" that is a theoretical maximum value of the modulation factor M are input to a subtractor 17. The subtractor 17 subtracts "0.78" from the modulation factor M to derive a modulation factor deviation ΔM, as shown in a formula (6) below.

$$\Delta M = M - 0.78 \quad (6)$$

The modulation factor deviation ΔM thus derived is input to the current adjustment command value deriving unit 16. The current adjustment command value deriving unit 16 integrates the modulation factor deviation ΔM by using a predetermined gain, and derives the integrated value as the d-axis current adjustment command value ΔId. The d-axis current adjustment command value ΔId is subtracted from the basic d-axis current command value Idb to derive the eventual d-axis current command value Id, as shown in the formula (1). That is, the d-axis current adjustment command value ΔId serves as a field-weakening command value for weakening the field flux of the electric motor MG.

Figure 3:
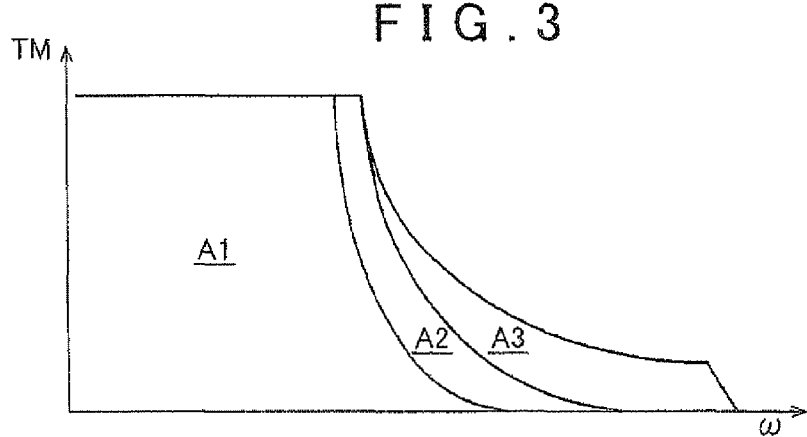
FIG. 3 is a diagram showing an example of a map referred to when determining a control mode.

The control device 2 according to the present embodiment is further provided with the mode determination unit 51 that determines the control mode for controlling the electric motor drive apparatus 1 and a carrier frequency determination unit 52 that determines the carrier frequency of the inverter 6. At least the required torque TM and the rotational speed ω are input to the mode determination unit 51 as input variables. The mode determination unit 51 determines one control mode among a plurality of predefined control modes for controlling the electric motor drive apparatus 1, based on the required torque TM and the rotational speed ω thus input. The control device 2 has a map for determination of the control mode stored in the parameter memory 64 or the like. In the present embodiment, three areas of a first area A1, a second area A2, and a third area A3 are defined on the map as operable areas of the electric motor MG as show in FIG. 3. Three control modes selectable by the mode determination unit 51 are defined corresponding to these areas. That is, the mode determination unit 51 selects a first control mode if the relation between the required torque TM and the rotational speed ω belongs to the first area A1, a second control mode if the relation belongs to the second area A2, or a third control mode if the relation belongs to the third area A3.

Regarding the control techniques involved in the control modes for controlling the electric motor drive apparatus 1, there are two techniques of the PWM control and rectangular-wave control with respect to the waveform of the alternating-current voltage supplied from the inverter 6 to the electric motor MG, and there are two techniques of the maximum torque control and the field-weakening control with respect to the phase of the alternating current supplied from the inverter 6 to the electric motor MG. Moreover, in the present embodiment, the PWM control includes two control methods of sine-wave PWM control and overmodulation PWM control. The three modes selectable by the mode determination unit 51 are structured by combining these techniques and methods.

The first control mode is a mode in which the inverter 6 performs the maximum torque control and the sine-wave PWM control when the inverter 6 converts the direct current to the alternating current. The sine-wave PWM control controls the on/off operation of the switching elements of the inverter 6 based on comparison of the sinusoidal alternating-current voltage command values Vu, Vv, and Vw with the carrier (carrier wave). The sinusoidal alternating-current voltage command values Vu, Vv, and Vw are derived by a three-phase command value deriving unit 35 of the voltage control unit 23 to be described later.

The second control mode is a mode in which the inverter 6 performs the maximum torque control and the overmodulation PWM control when the inverter 6 converts the direct current to the alternating current. The overmodulation PWM control distorts the waveforms of the fundamental wave components of the output voltage waveforms of the inverter 6, and makes the amplitudes thereof larger than those of the sinusoidal alternating-current voltage command values Vu, Vv, and Vw in the sine-wave PWM control. In that state, the overmodulation PWM control controls the on/off operation of the switching elements of the inverter 6 based on comparison of the distorted sinusoidal alternating-current voltage command values Vu, Vv, and Vw with the carrier, in the same manner as the sine-wave PWM control. Consequently, the PWM control is performed in which the alternating-current voltage command values Vu, Vv, and Vw are continuously at high levels or low levels in portions where the alternating-current voltage command values Vu, Vv, and Vw exceed the amplitude of the carrier wave. The distorted sinusoidal alternating-current voltage command values Vu, Vv, and Vw are derived by the three-phase command value deriving unit 35 of the voltage control unit 23 to be described later.

The third control mode is a mode in which the inverter 6 performs the field-weakening control and the rectangular-wave control when the inverter 6 converts the direct current to the alternating current. The rectangular-wave control controls the on/off operation of each of the switching elements of the inverter 6 so as to be performed once in one cycle (360° of magnetic pole position θ) of the electric angle. Then, each phase value of the alternating-current voltage command values Vu, Vv, and Vw is shaped into a rectangular waveform in which one high-level period and one low-level period alternately appear in one cycle. Accordingly, in the third control mode in the present embodiment, each phase value of the alternating-current voltage command values Vu, Vv, and Vw serves as a command value for an on/off switching phase that is a phase of the magnetic pole position θ simply representing the on/off switching timing of each of the switching elements of the inverter 6.

It should be noted that, in the third control mode in which the rectangular-wave control is performed, the synchronous control is performed in which the cycle of the electric angle of the electric motor MG detected as the magnetic pole position θ is synchronized with the switching cycle of the inverter 6. Here, the switching cycle is a cycle of the on/off timing of each of the switching elements of the inverter 6, and equal to a cycle of the on/off switching phase of each of the switching elements. On the other hand, in the first control mode in which the sine-wave PWM control is performed and the second control mode in which the overmodulation PWM control in performed, the switching control signals Pu, Nu, Pv, Nv, Pw, and Nw are generated based on the carrier. In these types of the PWM control, the asynchronous control is performed in which the cycle of the electric angle of the electric motor MG detected as the magnetic pole position θ is not synchronized with the switching cycle of the inverter 6. Accordingly, in the present embodiment, the third control mode is included in the "synchronous control mode" in the present invention, and the first and the second control modes are included in the "asynchronous control mode" in the present invention. The mode determination unit 51 has a function to select one of the plurality of control modes included in either of the synchronous control mode and the asynchronous control mode, and corresponds to a "control mode selection unit" in the present invention. As will be described later, the control device 2 is structured such that control blocks in the voltage control unit 23 are switched by a voltage control switching unit 46 so as to switch the method for generating the alternating-current voltage command values Vu, Vv, and Vw and the switching control signals Pu, Nu, Pv, Nv, Pw, and Nw, depending on which of the synchronous control mode and the asynchronous control mode is selected by the mode determination unit 51.

In the present embodiment, the d-axis current adjustment command value ΔId derived by the current adjustment command value deriving unit 16 is also input to the mode determination unit 51. Then, the mode determination unit 51 determines whether or not the third control mode is to be selected, based on the d-axis current adjustment command value ΔId thus input. More specifically, the mode determination unit 51 permits to select the third control mode if the d-axis current adjustment command value ΔId is a predetermined threshold value for permission of shifting to third control mode or more, or, on the other hand, prohibits to select the third control mode if the d-axis current adjustment command value ΔId is less than the threshold value for permission of shifting to third control mode. Therefore, the mode determination unit 51 according to the present embodiment is structured so as to determine, as a prerequisite, the control mode based on the required torque TM and the rotational speed ω that are input, and set a certain limit to the control mode selection based on the d-axis current adjustment command value ΔId that is additionally input.

At least the rotational speed ω and the required torque TM are input to the carrier frequency determination unit 52 as input variables. The carrier frequency determination unit 52 determines a carrier frequency Fe that is the frequency of the carrier (carrier wave) of the switching control signals Pu, Nu, Pv, Nv, Pw, and Nw for the inverter 6, based on the required torque TM and the rotational speed ω thus input. In the present embodiment, the control device 2 has a map for determination of the carrier frequency stored in the parameter memory 64 or the like. The carrier frequency determination unit 52 determines an optimal value of the carrier frequency Fc for reducing a loss in the inverter 6 and a loss in the electric motor MG depending on the required torque TM and the rotational speed w of the electric motor MG, and so on. In this case, the carrier frequency determination unit 52 determines the optimal carrier frequency Fe, for example, by selecting the optimal carrier frequency Fe from a plurality of predetermined selectable carrier frequencies based on the map. Note that the carrier frequency determination unit 52 may be structured so as to determine the carrier frequency Fc based on the rotational speed w and the modulation factor M input to the carrier frequency determination unit 52 either instead of, or together with, the required torque TM.

The modulation factor M and the voltage command phase θv derived by the modulation factor and voltage command phase deriving unit 22 are input to the voltage control unit 23. The magnetic pole position θ detected by the rotation sensor 8 (refer to FIG. 1) and the carrier frequency Fc determined by the carrier frequency determination unit 52 are also input to the voltage control unit 23. Based on the modulation factor M, the voltage command phase θv, the magnetic pole position θ, and the carrier frequency Fc thus input, the voltage control unit 23 performs the voltage control processing that determines the alternating-current voltage command values Vu, Vv, and Vw, and generates the switching control signals Pu, Nu, Pv, Nv, Pw, and Nw for the inverter 6. In the present embodiment, the voltage control unit 23 is provided with the three-phase command value deriving unit 35 and an asynchronous control signal generating unit 41, as well as an on/off switching phase deriving unit 43 and a synchronous control signal generating unit 42.

In addition, the voltage control switching unit 46 is provided between the modulation factor and voltage command phase deriving unit 22 and the voltage control unit 23. The voltage control switching unit 46 switches the control blocks in the voltage control unit 23 depending on the control mode selected by the mode determination unit 51. Specifically, if the first control mode or the second control mode included in the asynchronous control mode is selected, the modulation factor M and the voltage command phase θv derived by the modulation factor and voltage command phase deriving unit 22 are input to the three-phase command value deriving unit 35 to cause the three-phase command value deriving unit 35 and the asynchronous control signal generating unit 41 to perform the voltage control processing. On the other hand, if the third control mode included in the synchronous control mode is selected, the modulation factor M and the voltage command phase θv derived by the modulation factor and voltage command phase deriving unit 22 are input to the on/off switching phase deriving unit 43 to cause the on/off switching phase deriving unit 43 and the synchronous control signal generating unit 42 to perform the voltage control processing. The voltage control switching unit 46 switches the input destination of the modulation factor M and the voltage command phase θv as described above, depending on the control mode selected by the mode determination unit 51, Consequently, the voltage control unit 23 generates the switching control signals Pu, Nu, Pv, Nv, Pw, and Nw depending on the control mode selected by the mode determination unit 51.

Figure 4:
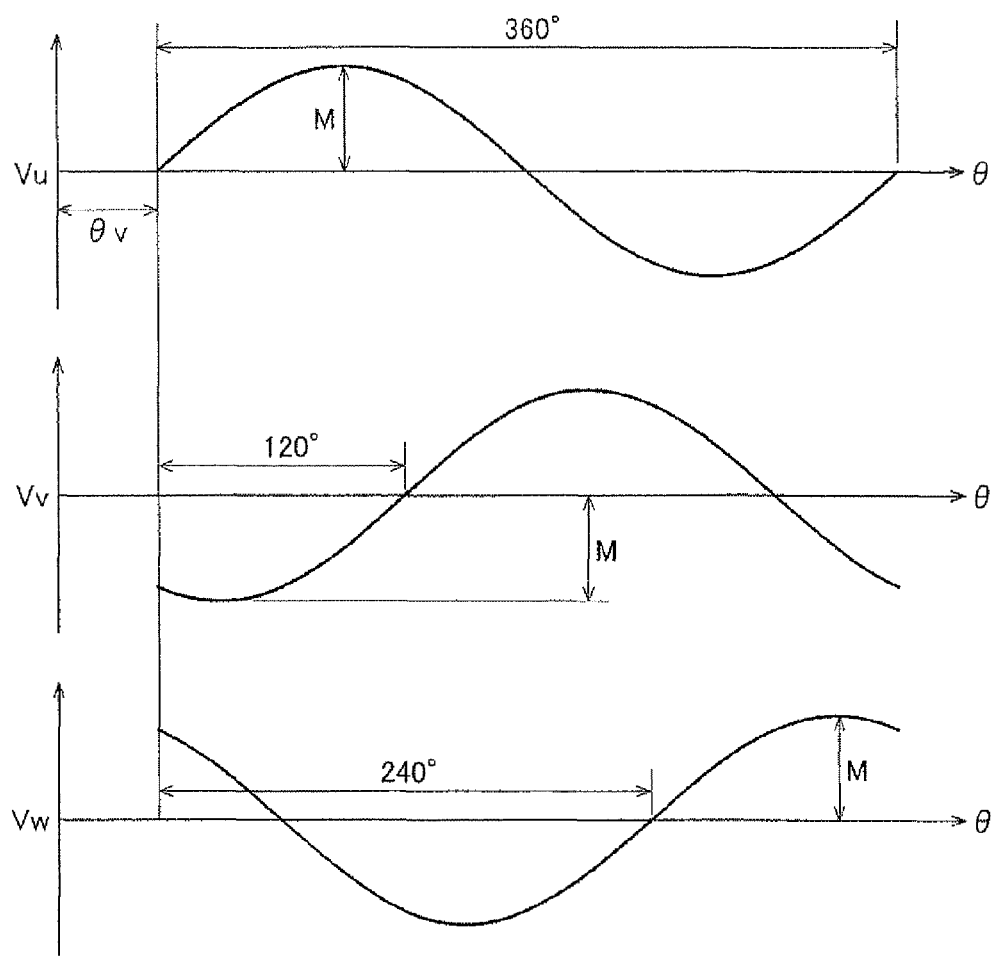
FIG. 4 is a diagram showing an example of alternating-current voltage command values in a first control mode.

The three-phase command value deriving unit 35 generates the three-phase sinusoidal alternating-current voltage command values Vu, Vv, and Vw based on the modulation factor M and the voltage command phase θv input. FIG. 4 is a diagram showing an example of the alternating-current voltage command values Vu, Vv, and Vw generated by the three-phase command value deriving unit 35. This diagram shows the example in which the alternating-current voltage command values Vu, Vv, and Vw are the voltage command values in the first control mode. In this case, the u-phase voltage command value Vu is the sinusoidal voltage command value that has a phase behind the origin (θ=0°) of the magnetic pole position θ by the voltage command phase θv, an amplitude equal to the modulation factor M, and a cycle equal to one turn of the magnetic pole position θ (electric angle of one turn, 360°). The v-phase voltage command value Vv and the w-phase voltage command value Vw are the sinusoidal voltage command values that have phases behind the phase of the u-phase voltage command value Vu by 120° and by 240', respectively. If the second control mode is selected, the alternating-current voltage command values Vu, Vv, and Vw have distorted sinusoidal waveforms. However, the phases and the amplitudes of the command values are the same as those in FIG. 4.

Here, the three-phase command value deriving unit 35 is provided with an alternating-current voltage command value map specifying a waveform of the alternating-current voltage command values Vu, Vv, and Vw for each of the control modes, and generates and outputs the alternating-current voltage command values Vu, Vv, and Vw based on the alternating-current voltage command value map depending on the control mode determined by the mode determination unit 51. For example, in the case of the alternating-current voltage command value map for the first control mode, the map specifies a sinusoidal voltage waveform with the origin thereof coinciding with the origin ($\theta=0°$) of the magnetic pole position $\theta$ and the amplitude thereof equal to one. The three-phase command value deriving unit 35 can generate the u-phase voltage command value Vu by delaying the origin of the voltage waveform specified in the map by the voltage command phase $\theta v$, and multiplying the amplitude thereof by the modulation factor M, and generate the v-phase voltage command value Vv and the w-phase voltage command value Vw by delaying the phase of the u-phase voltage command value Vu by 120°, and 240°, respectively. The three-phase command value deriving unit 35 is provided with a map of a different voltage waveform for each of the control modes.

The alternating-current voltage command values Vu, Vv, and Vw generated by the three-phase command value deriving unit 35 and the carrier frequency Fc determined by the carrier frequency determination unit 52 are input to the asynchronous control signal generating unit 41. The asynchronous control signal generating unit 41 generates the switching control signals Pu, Nu, Pv, Nv, Pw, and Nw for the inverter 6 based on the alternating-current voltage command values Vu, Vv, and Vw and on the carrier (carrier wave). Specifically, the asynchronous control signal generating unit 41 compares the alternating-current voltage command values Vu, Vv, and Vw with the carrier, and generates the six switching control signals Pu, Nu, Pv, Nv, Pw, and Nw for PWM-controlling the switching elements on the upper side of the u-phase, the lower side of the u-phase, the upper side of the v-phase, the lower side of the v-phase, the upper side of the w-phase, and the lower side of the w-phase of the inverter 6. Accordingly, the asynchronous control signal generating unit 41 outputs the switching control signal to each of the switching elements basically twice in each carrier cycle. The on/off pulse width represented by the switching control signal changes in a stepwise manner for each carrier cycle, depending on the level of each of the substantially sinusoidal alternating-current voltage command values Vu, Vv, and Vw that change continuously with the carrier. In the present embodiment, the carrier frequency Fc is not an integral multiple of a frequency of the alternating-current voltage command values Vu, Vv, and Vw. Therefore, the carrier cycle of the switching control signals Pu, Nu, Pv, Nv, Pw, and Nw is not synchronized with the cycle of the alternating-current voltage command values Vu, Vv, and Vw. That is, asynchronous PWM control is performed in both of the first control mode and the second control mode. Accordingly, in the present embodiment, the asynchronous control mode is a mode in which the asynchronous PWM control is performed. However, the control method of generating the switching control signals Pu, Nu, Pv, Nv, Pw, and Nw based on the carrier includes also synchronous PWM control in which, for example, the PWM control is performed while the carrier cycle is synchronized with the cycle of the alternating-current voltage command values Vu, Vv, and Vw.

In the synchronous PWM control as described above, the switching cycle of the inverter 6 is also determined depending on the amplitude of the alternating-current voltage command values Vu, Vv, and Vw in the same manner as in the asynchronous PWM control. Therefore, the cycle of the electric angle (magnetic pole position $\theta$) of the electric motor MG is not synchronized with the switching cycle of the inverter 6. That is, in overall PWM control mode including both of the synchronous PWM control and the asynchronous PWM control, the timing for on/off switching of each the switching elements of the inverter 6 is not uniquely determined by the electric angle (phase) of the electric motor MG. Accordingly, the PWM control mode as described above is included in the asynchronous control mode in the present invention.

Figure 5:
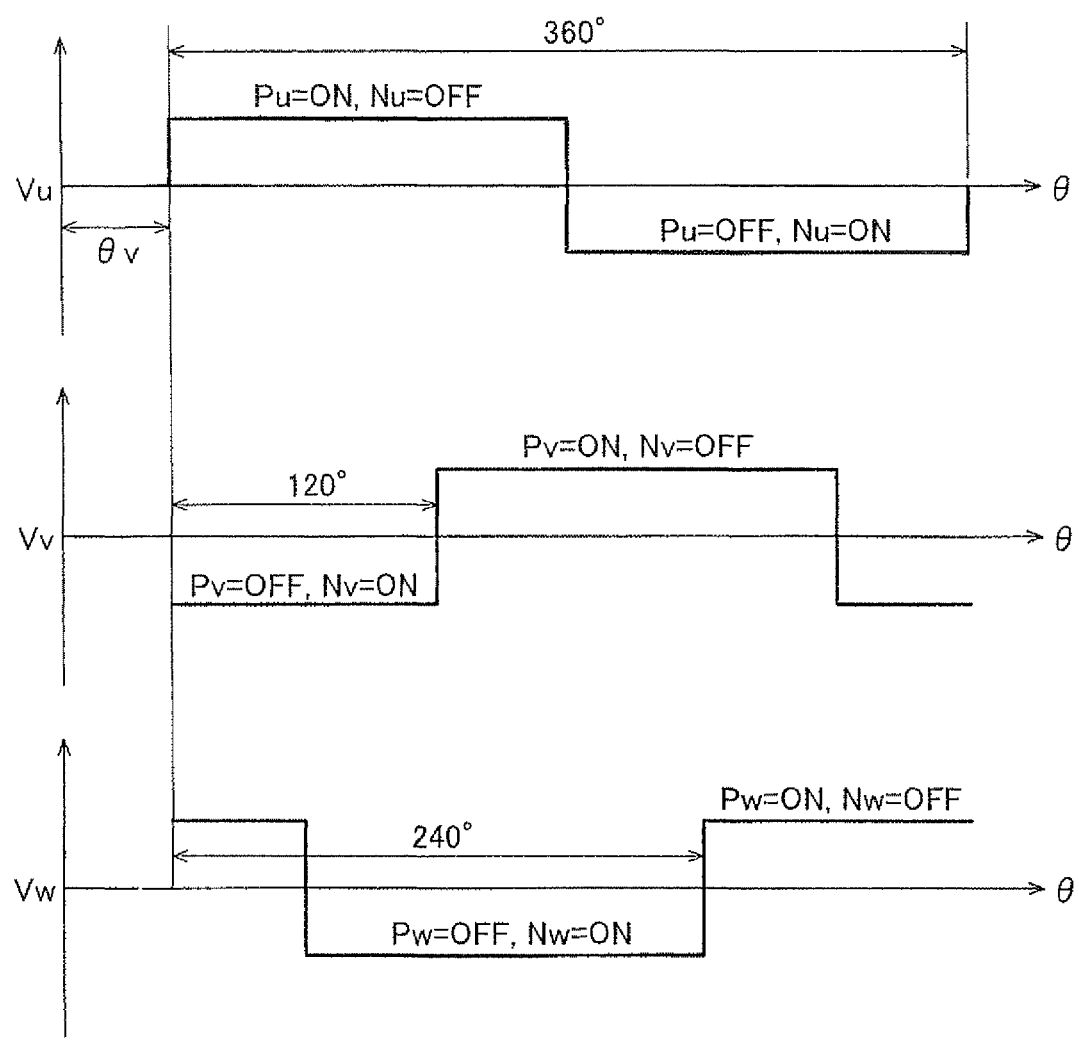
FIG. 5 is a diagram showing an example of alternating-current voltage command values in a third control mode.

The on/off switching phase deriving unit 43 generates command values for the on/off switching phases of the switching elements of the inverter 6 as the alternating-current voltage command values Vu, Vv, and Vw, based on the modulation factor M and the voltage command phase $\theta v$ input. Each of these command values corresponds to the on/off control signal for each of the switching elements, being a command value indicating the phase of the magnetic pole position $\theta$ representing the timing for on/off switching of each of the switching elements. FIG. 5 graphically illustrates the data represented by the alternating-current voltage command values Vu, Vv, and Vw generated by the on/off switching phase deriving unit 43, showing the phases at which each of the switching elements is switched on or off, on the horizontal axis for the magnetic pole position $\theta$. In this example, the u-phase voltage command value Vu has a phase behind the origin ($\theta=0°$) of the magnetic pole position $\theta$ by the voltage command phase $\theta v$, and one turn of the magnetic pole position $\theta$ (electric angle of one turn, 360°) corresponds to one cycle. At the voltage command phase $\theta v$, the switching control signal Pu corresponding to the switching element on the upper side of the u-phase is switched on, and the switching control signal Nu corresponding to the switching element on the lower side of the u-phase is switched off. At the point of a half turn of the magnetic pole position $\theta$ (electric angle of a half turn, 180°) from the voltage command phase $\theta v$, the switching control signal Pu corresponding to the switching element on the upper side of the u-phase is switched off, and the switching control signal Nu corresponding to the switching element on the lower side of the u-phase is switched on. The v-phase voltage command value Vv and the w-phase voltage command value Vw are the same command values as the u-phase voltage command value Vu except that the command values Vv and Vw have the phases behind the phase of the command value Vu by 120° and by 240°, respectively. It should be noted that the alternating-current voltage command values Vu, Vv, and Vw actually output from the on/off switching phase deriving unit 43 can be composed only of information on the phases of the magnetic pole position $\theta$ serving as information for indicating the on/off switching timings of the switching elements corresponding to the u-phase, the v-phase, and the w-phase. Accordingly, the alternating-current voltage command values Vu, Vv, and Vw as these command values for the on/off switching phases may be output collectively as a series of information on the u-phase, v-phase, and w-phase command values.

Here, the on/off switching phase deriving unit 43 is provided with an on/off switching phase map specifying the on/off switching phase of the switching elements constituting the alternating-current voltage command values Vu, Vv, and Vw for each of the control modes, and generates and outputs the alternating-current voltage command values Vu, Vv, and Vw based on the on/off switching phase map. The on/off switching phase map specifies, for example, the phase that has an origin coinciding with the origin ($\theta=0°$) of the magnetic pole position $\theta$, and a point at which the state is switched between the state of the upper side switching element being on and the lower side switching element being off, and the state of the upper side switching element being off and the lower side switching element being on, for each of the u-phase, the v-phase, and the w-phase. The on/off switching phase deriving unit 43 can generate the u-phase voltage command value Vu by delaying the origin of the on/off phase specified in the map by the voltage command phase $\theta v$, and generate the v-phase voltage command value Vv and the w-phase voltage command value Vw by delaying the phase of the u-phase voltage command value Vu by 120°, and by 240', respectively.

The alternating-current voltage command values Vu, Vv, and Vw generated by the on/off switching phase deriving unit 43 are input to the synchronous control signal generating unit 42. The synchronous control signal generating unit 42 generates the switching control signals Pu, Nu, Pv, Nv, Pw, and Nw for the inverter 6 based on the alternating-current voltage command values Vu, Vv, and Vw. Specifically, the synchronous control signal generating unit 42 generates the six switching control signals Pu, Nu, Pv, Nv, Pw, and Nw for controlling the on/off states of the switching elements on the upper side of the u-phase, the lower side of the u-phase, the upper side of the v-phase, the lower side of the v-phase, the upper side of the w-phase, and the lower side of the w-phase of the inverter 6, according to the command values for the on/off switching phases of the switching elements of the inverter 6. The on/off pulse width represented by the switching control signal is set to a predetermined width according to the on/off switching phases. At the same time, the voltage control unit 23 including the synchronous control signal generating unit 42 is performing the voltage control processing at a predetermined calculation cycle, and the switching control signals Pu, Nu, Pv, Nv, Pw, and Nw are output at the predetermined calculation cycle, thus changing the timing for on/off switching of each the switching elements. Accordingly, the timing for on/off switching of each the switching elements is changed at the predetermined calculation cycle, whereas the switching elements of the inverter 6 are controlled in synchronization with the electric angle (magnetic pole position $\theta$) of the electric motor MG. Consequently, the cycle of the electric angle of the electric motor MG and the switching cycle (cycle of on/off timing of switching element) of the inverter 6 are synchronized with each other. In this way, in the synchronous control mode, the timing for on/off switching of each the switching elements of the inverter 6 is uniquely determined by the electric angle (phase) of the electric motor MG.

1-3. Processing Cycle of Each Unit Depending on Control Mode

Figure 7:
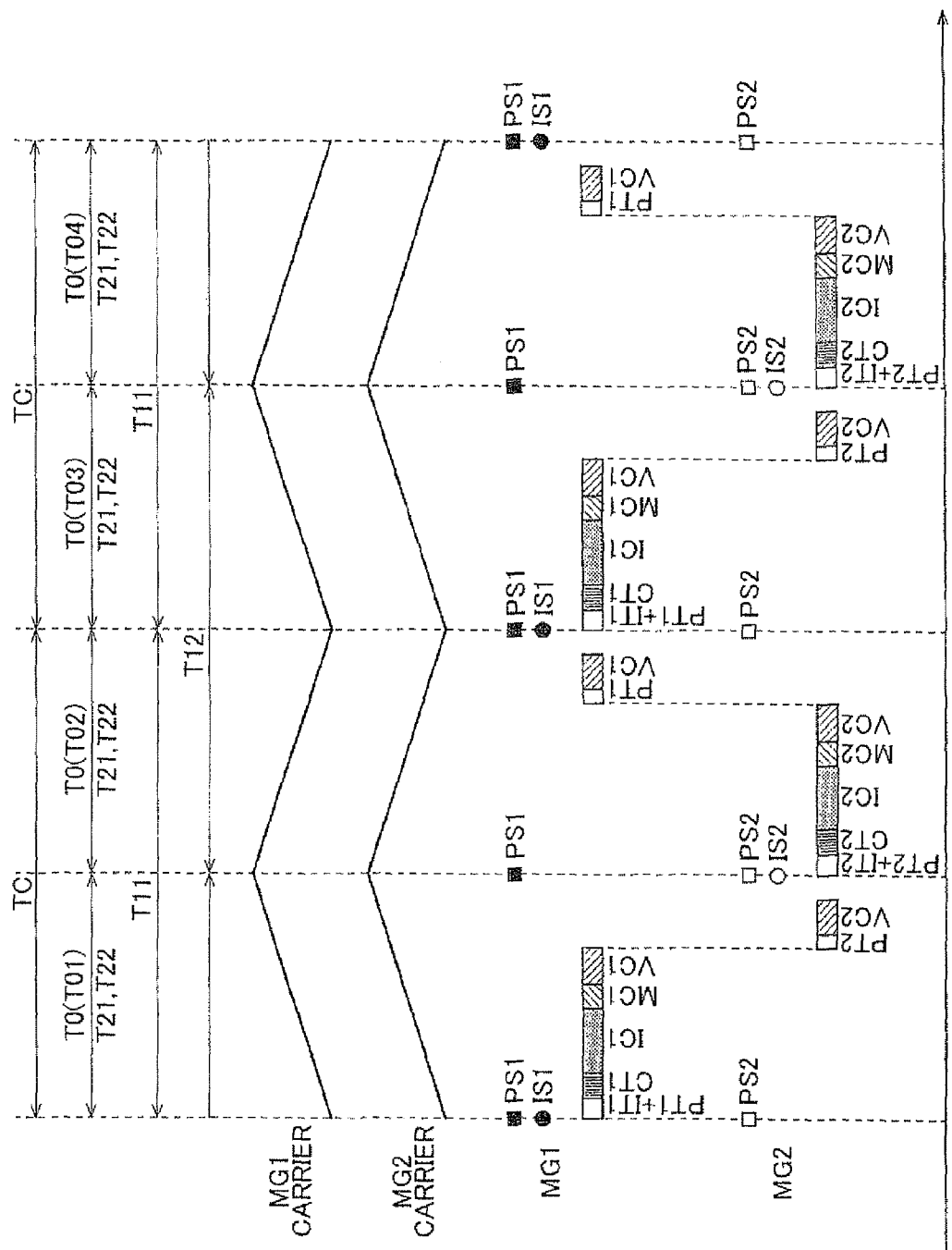
FIG. 7 is a time chart in the case of control in an asynchronous control mode according to the first embodiment.
Figure 8:
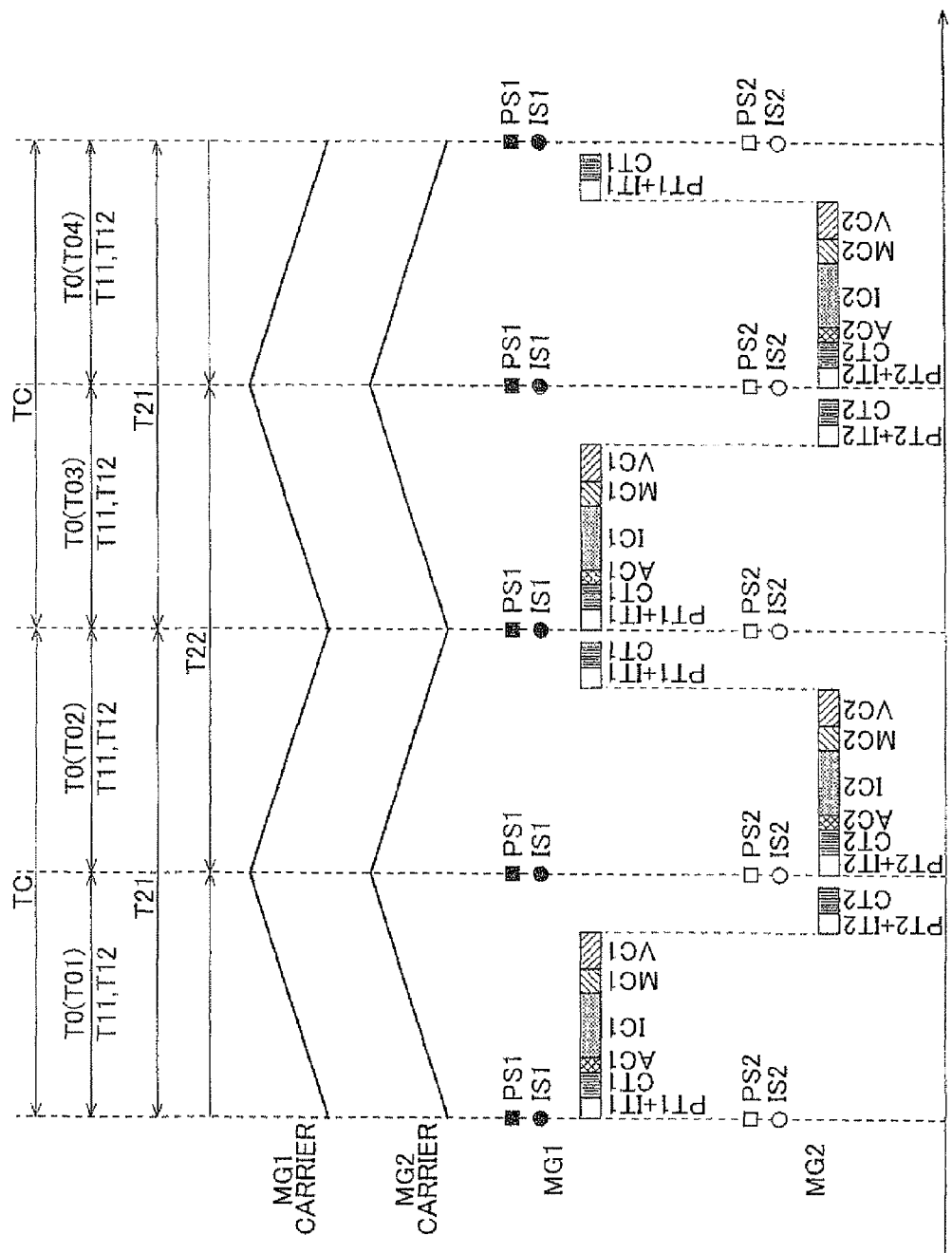
FIG. 8 is a time chart in the case of control in a synchronous control mode according to the first embodiment.

Next, description will be made of setting of a processing cycle of each of the units of the control device 2 depending on the control mode as an essential part of the present invention. The control device 2 is structured so as to switch the setting of the processing cycle of each of the units depending on whether the control mode selected by the mode determination unit 51 is the synchronous control mode or the asynchronous control mode. It is an object of the present invention to suppress aliasing in current sampling from occurring when the rotational speed of the rotor of the electric motor MG is high, while using the single CPU core 62 with a limited processing capacity. For that purpose, the control device 2 switches particularly the settings of the cycle of the current detection processing IS (IS1 and IS2) performed by the current sensors 7 (7a and 7b) and the cycle of the voltage control processing VC (VC1 and VC2) performed by the voltage control unit 23, depending on the control mode. In this case, as shown in FIGS. 7 and 8, the control device 2 sets the cycle of each processing on the basis of the standard calculation cycle T0 that is set to a half of the carrier cycle TC. For example, the carrier cycle TC is set to approximately 50 to 600 [μs], and the standard calculation cycle T0 is set to the cycle of a half of that value. In order to suppress the influence by noise due to on/off operation of the switching elements of the inverter 6, the standard calculation cycle T0 thus set corresponds to the shortest current detection cycle in the case of performing the current detection processing by the current sensor 7 at the time when the waveform of the carrier is at a maximum (peak) or a minimum (valley). A series of the control processing (electric motor control processing) operations by the units of the control device 2 described below are started by execution of an interrupt function of the CPU 61 in every standard calculation cycle T0 measured by the timer 66 (refer to FIG. 1) of the CPU 61.

In the present embodiment, the control device 2 is structured so as to perform the calculation processing for the current feedback control of the two (=N) electric motors MG1 and MG2 with the single CPU core 62. Accordingly, if the asynchronous control mode is selected, the control device 2 performs the voltage control processing VC (VC1 and VC2) for the two N) electric motors MG1 and MG2 in every standard calculation cycle T0 sequentially in the same standard calculation cycle T0, and also performs the current detection processing IS (IS1 and IS2) for the two (=N) electric motors MG1 and MG2 in a cycle of twice (=N times) longer than the standard calculation cycle T0 at mutually different times, as shown in FIG. 7. Thus, the control device 2 performs the voltage control processing VC (VC1 and VC2) twice (=N times) by feeding back the current detection values Iur, Ivr, and Iwr detected by performing the current detection processing IS (IS1 and IS2) once for each of the two (=N) electric motors MG1 and MG2. On the other hand, if the synchronous control mode is selected, the control device 2 performs the current detection processing IS (IS1 and IS2) for the two (=N) electric motors MG1 and MG2 in every standard calculation cycle T0, and also performs the voltage control processing VC (VC1 and VC2) for the two (=N) electric motors MG1 and MG2 in a cycle of twice (=N times) longer than the standard calculation cycle T0 in the mutually different standard calculation cycles T0, as shown in FIG. 8. Thus, the control device 2 performs the voltage control processing VC (VC1 and VC2) once by feeding back the current detection values Iur, Ivr, and Iwr for two (=N) times detected by repeating the current detection processing IS (IS1 and IS2) twice (=N times).

Here, the voltage control processing VC (VC1 and VC2) is a process performed by the voltage control unit 23, in which the alternating-current voltage command values Vu, Vv, and Vw are determined based on the modulation factor M and the voltage command phase $\theta v$ derived by the modulation factor and voltage command phase deriving processing MC (MC1 and MC2) and on the magnetic pole position $\theta$ taken in by magnetic pole position take-in processing PT (PT1 and PT2), and the switching control signals Pu, Nu, Pv, Nv, Pw, and Nw for the inverter 6 are generated based on the alternating-current voltage command values Vu, Vv, and Vw. The current detection processing IS (IS1 and IS2) is a process to detect the currents flowing in the respective coils of the two electric motors MG1 and MG2 by using the current sensors 7 (7a and 7b). Regarding the current detection cycles that are the cycles at which the current detection processing operations IS (IS1 and IS2) are performed and the voltage control cycles that are the cycles at which the voltage control processing operations VC (VC1 and VC2) are performed, it should be noted that, in FIGS. 7 and 8, the current detection cycle for the first electric motor MG1 is denoted as "T11"; the current detection cycle for the second electric motor MG2 is denoted as "T12"; the voltage control cycle for the first electric motor MG1 is denoted as "T21"; and the voltage control cycle for the second electric motor MG2 is denoted as "T22".

The control device 2 also switches the cycles of other processing operations corresponding to switching of the current detection cycle T1 and the voltage control cycle T2. Specifically, current value take-in processing IT (IT1 and IT2) and three-phase/two-phase conversion processing CT (CT1 and CT2) for each of the two electric motors MG1 and MG2 are performed after the current detection processing IS (IS1 and IS2) for each of the two electric motors MG1 and MG2 at the same cycle as that of the current detection processing IS (IS1 and IS2). These processing operations are processing operations performed in association with the current detection processing IS (IS1 and IS2) at the same cycle as that of the current detection processing IS (IS1 and IS2) in order to feed back and reflect the current detection values Iur (Iur1 and Iur2), Ivr (Ivr1 and Ivr2), and Iwr (Iwr1 and Iwr2) detected by the current detection processing IS (IS1 and IS2) to the voltage control processing VC (VC1 and VC2). Accordingly, if the asynchronous control mode is selected, the control device 2 performs the current value take-in processing IT (IT1 and IT2) and the three-phase/two-phase conversion processing CT (CT1 and CT2) for each of the two electric motors MG1 and MG2 in a cycle of twice (=N times) longer than the standard calculation cycle T0 in the mutually different standard calculation cycles T0, as shown in FIG. 7; whereas if the synchronous control mode is selected, the control device 2 performs the current value take-in processing IT (IT1 and IT2) and the three-phase/two-phase conversion processing CT (CT1 and CT2) for each of the two electric motors MG1 and MG2 in every standard calculation cycle T0, as shown in FIG. 8.

Here, the current value take-in processing IT (IT1 and IT2) is a process to convert the current detection values Iur, Ivr, and Iwr detected by each of the current sensors 7 (7a and 7b) for each of the two electric motors MG1 and MG2 from analog to digital form using the A/D converter 67 and to take in the converted data. The three-phase/two-phase conversion processing CT (CT1 and CT2) is a process to convert the current detection values Iur, Ivr, and Iwr taken in by the current value take-in processing IT (IT1 and IT2) from three-phase currents to two-phase currents using the three-phase/two-phase conversion unit 36 to derive the two-phase current detection values Idr and Iqr.

As shown in FIGS. 7 and 8, the magnetic pole position detection processing PS (PS1 and PS2) and the magnetic pole position take-in processing PT (PT1 and PT2) for each of the two electric motors MG1 and MG2 are performed in every standard calculation cycle T0 regardless of the control mode. These processing operations are desirable to be performed in the shortest calculation cycle in order to appropriately perform the voltage control processing VC (VC1 and VC2) by the voltage control unit 23 and the three-phase/two-phase conversion processing CT (CT1 and CT2) by the three-phase/two-phase conversion unit 36 based on the correct magnetic pole position θ. Therefore, the processing operations PS and PT are performed here in the standard calculation cycle T0 that is the shortest calculation cycle. Here, the magnetic pole position detection processing PS (PS1 and PS2) is a process to detect the magnetic pole positions θ of the respective rotors of the two electric motors MG1 and MG2 based on the rotation detection signals from the rotation sensors 8 (8a and 8b). The magnetic pole position take-in processing PT (PT1 and PT2) is a process to convert the magnetic pole positions θ detected by the rotation sensors 8 (8a and 8b) from analog to digital form using the A/D converter 67 and to take in the converted data.

As shown in FIG. 7, the average current value calculation processing AC (AC1 and AC2) is not performed in the asynchronous control mode. If the synchronous control mode is selected, the control device 2 performs the average current value calculation processing AC (AC1 and AC2) for each of the two electric motors MG1 and MG2 in a cycle of twice (=N times) longer than the standard calculation cycle T0 in the mutually different standard calculation cycles T0, as shown in FIG. 8. Here, the average current value calculation processing AC (AC1 and AC2) is a process to perform the average value calculation that calculates the average values of the current detection values for two (=N) times detected by repeating the current detection processing IS (IS1 and IS2) twice (=N times). In the present embodiment, the average current value calculation processing AC (AC1 and AC2) is a process that calculates the average values of the two-phase current detection values Idr and Iqr after being converted from three-phase currents to two-phase currents by the three-phase/two-phase conversion processing CT (CT1 and CT2). That is, the average current value calculation processing AC (AC1 and AC2) calculates the average value of each of the two-phase current detection values Idr and Iqr for two (=N) times. Then, after this processing, if the synchronous control mode is selected, the current control processing is performed by using the average values of the two-phase current detection values Idr and Iqr in the current control processing IC (IC1 and IC2). Consequently, the current control processing IC (IC1 and IC2) and the subsequent voltage control processing VC (VC1 and VC2) are performed by appropriately feeding back the current detection values Idr and Iqr for two (=N) times detected by repeating the current detection processing IS (IS1 and IS2) twice (=N times).

As shown in FIGS. 7 and 8, the current control processing IC (IC1 and IC2) for each of the two electric motors MG1 and MG2 is performed in a cycle of twice (=N times) longer than the standard calculation cycle T0 in the mutually different standard calculation cycles T0 regardless of the control mode. However, the contents of the current control processing IC (IC1 and IC2) differ depending on the control mode. Here, the current control processing IC (IC1 and IC2) is a process to determine the two-phase voltage command values Vd and Vq based on the deviations between the two-phase current detection values Idr and Iqr after being converted from three-phase currents to two-phase currents by the three-phase/two-phase conversion processing CT (CT1 and CT2), and the d-axis current command value Id and the q-axis current command value Iq serving as the two-phase current command values. Accordingly, the current control processing IC (IC1 and IC2) is basically desirable to be performed at the same cycle as that of the current detection processing IS (IS1 and IS2) in the same manner as the current value take-in processing IT (IT1 and IT2) and the three-phase/two-phase conversion processing CT (CT1 and CT2). However, in the present embodiment, the control device 2 performs the current control processing IC (IC1 and IC2) at the same cycle as that of the current detection processing IS (IS1 and IS2) only in the asynchronous control mode in which the current detection processing IS (IS1 and IS2) is performed in a cycle of twice (=N times) longer than the standard calculation cycle T0. In the synchronous control mode in which the current detection processing IS (IS1 and IS2) is performed in every standard calculation cycle T0, the control device 2 performs the current control processing IC (IC1 and IC2) in a cycle of twice (=N times) longer than the cycle of the current detection processing IS (IS1 and IS2). It should be noted that, as described above, in the synchronous control mode, the control device 2 performs the average current value calculation processing AC (AC1 and AC2), and uses the average values of the current detection values Idr and Iqr for two (=N) times for the current control processing IC (IC1 and IC2). Consequently, in the current control processing IC (IC1 and IC2), the current control unit 13 determines the two-phase voltage command values Vd and Vq by appropriately feeding back the current detection values Idr and Iqr for two (=N) times. As a result, in the present embodiment, the execution cycle of the current control processing IC (IC1 and IC2) is the same regardless of the control mode, and, as shown in FIGS. 7 and 8, the control device 2 performs the current control processing IC (IC1 and IC2) for each of the two (=N) electric motors MG1 and MG2 in a cycle of twice (=N times) longer than the standard calculation cycle T0 in the mutually different standard calculation cycles T0.

As shown in FIGS. 7 and 8, the modulation factor and voltage command phase deriving processing MC (MC1 and MC2) for each of the two electric motors MG1 and MG2 is performed in a cycle of twice (=N times) longer than the standard calculation cycle T0 in the mutually different standard calculation cycles T0, regardless of the control mode. Here, the modulation factor and voltage command phase deriving processing MC (MC1 and MC2) is a process to derive the modulation factor M and the voltage command phase θv based on the two-phase voltage command values Vd and Vq determined by the current control processing IC (IC1 and IC2) and on the direct-current voltage Vdc. Therefore, in the present embodiment, the control device 2 performs the modulation factor and voltage command phase deriving processing MC (MC1 and MC2) for each of the two electric motors MG1 and MG2 at the same cycle as that of the current control processing IC (IC1 and IC2) after the current control processing IC (IC1 and IC2) for each of the two electric motors MG1 and MG2. That is, the execution cycle of the modulation factor and voltage command phase deriving processing MC (MC1 and MC2) is the same regardless of the control mode, and, as shown in FIGS. 7 and 8, the control device 2 performs the modulation factor and voltage command phase deriving processing MC (MC1 and MC2) for each of the two (=N) electric motors MG1 and MG2 in a cycle of twice (=N times) longer than the standard calculation cycle T0 in the mutually different standard calculation cycles T0.

As described above, in the present embodiment, if the synchronous control mode is selected, the average current value calculation processing AC (AC1 and AC2), the current control processing IC (IC1 and IC2), and the modulation factor and voltage command phase deriving processing MC (MC1 and MC2), as well as the voltage control processing VC (VC1 and VC2), are performed for each of the two (=N) electric motors MG1 and MG2 in a cycle of twice (=N times) longer than the standard calculation cycle T0. If the asynchronous control mode is selected, the current value take-in processing IT (IT1 and IT2), the three-phase/two-phase conversion processing CT (CT1 and CT2), the current control processing IC (IC1 and IC2), and the modulation factor and voltage command phase deriving processing MC (MC1 and MC2), as well as the current detection processing IS (IS1 and IS2), are performed for each of the two (=N) electric motors MG1 and MG2 in a cycle of twice (=N times) longer than the standard calculation cycle T0. In addition, as shown in FIGS. 7 and 8, the processing operations performed for each of the two (=N) electric motors MG1 and MG2 in a cycle of twice N times) longer than the standard calculation cycle T0 either in the mutually different standard calculation cycles T0 or in the standard calculation cycle T0 as described above are alternately executed in every standard calculation cycle T0. Therefore, in the present embodiment, the control device 2 monitors whether the standard calculation cycle T0 is repeated an odd number of times or an even number of times, and, for example, performs the processing for the first electric motor MG1 in the odd numbered cycle and the processing for the second electric motor MG2 in the even numbered cycle, depending on the monitoring result. In this case, the cycle of the processing for the first electric motor MG1 and the cycle of the processing for the second electric motor MG2 are relatively shifted by a half of the cycle (here, equal to the standard calculation cycle T0) of the processing. In addition, for the processing to be performed in every standard calculation cycle T0, the control device 2 first performs the processing for the first electric motor MG1 and then performs the processing for the second electric motor MG2 in the odd numbered cycle, whereas the control device 2 first performs the processing for the second electric motor MG2 and then performs the processing for the first electric motor MG1 in the even numbered cycle. As a matter of course, the setting can be changed as appropriate as to which of the two electric motors MG1 and MG2 is to be subjected to the processing in either of the odd numbered and the even numbered standard calculation cycles T0.

Note that the mode determination processing by the mode determination unit 51 and the carrier frequency determination processing by the carrier frequency determination unit 52 are not included in the time charts of FIGS. 7 and 8. The calculation processing of these processing operations need not be performed particularly frequently because the update cycle of input variables for each of these processing operations is sufficiently longer than the standard calculation cycle T0. Therefore, these processing operations have a longer calculation cycle that those of the above-described processing operations. Accordingly, although not illustrated, the mode determination processing and the carrier frequency determination processing are performed by using an idle time during which the processing operations shown in the timing charts of FIGS. 7 and 8 are not performed, in each of the standard calculation cycles T0. If not completed within the single standard calculation cycle T0, the processing operations are performed piecemeal in the multiple standard calculation cycles T0.

1-4. Procedures of Electric Motor Control Processing

Next, procedures of the electric motor control processing according to the present embodiment will be described with reference to a flow chart in FIGS. 6A and 6B and the time charts in FIGS. 7 and 8. The control device 2 performs the procedures of processing of the units for the electric motor control processing. It should be noted that, in the present embodiment, the functional units of the control device 2 are structured with the electric motor control program stored in the program memory 63 (refer to FIG. 1), and the CPU core 62 serving as the calculation processing unit provided in the control device 2 operates as the computer for executing the electric motor control program.

In the electric motor control processing according to the present embodiment, the calculation processing in each of the functional units of the control device 2 is performed, as a prerequisite, based on the standard calculation cycle T0 serving as a cycle of the interrupt processing by the CPU 61, as shown in FIGS. 7 and 8. Also, the magnetic pole position detection processing PS1 for the first electric motor MG1 and the magnetic pole position detection processing PS2 for the second electric motor MG2 are performed in every standard calculation cycle T0, regardless of the control mode. On the other hand, the current detection processing IS1 for the first electric motor MG1 and the current detection processing IS2 for the second electric motor MG2 are performed in a cycle of twice N times) longer than the standard calculation cycle T0 at mutually different times if the asynchronous control mode is selected, or in every standard calculation cycle T0 if the synchronous control mode is selected. The magnetic pole position θ as a detection value of the magnetic pole position detection processing PS (PS1 and PS2) and the current detection values Iur, Ivr, and Iwr of each of the electric motors MG (MG1 and MG2) as detection values of the current detection processing IS (IS1 and IS2) are temporarily stored in analog memory (not shown) or the like to be used for the later processing.

Figure 6A:
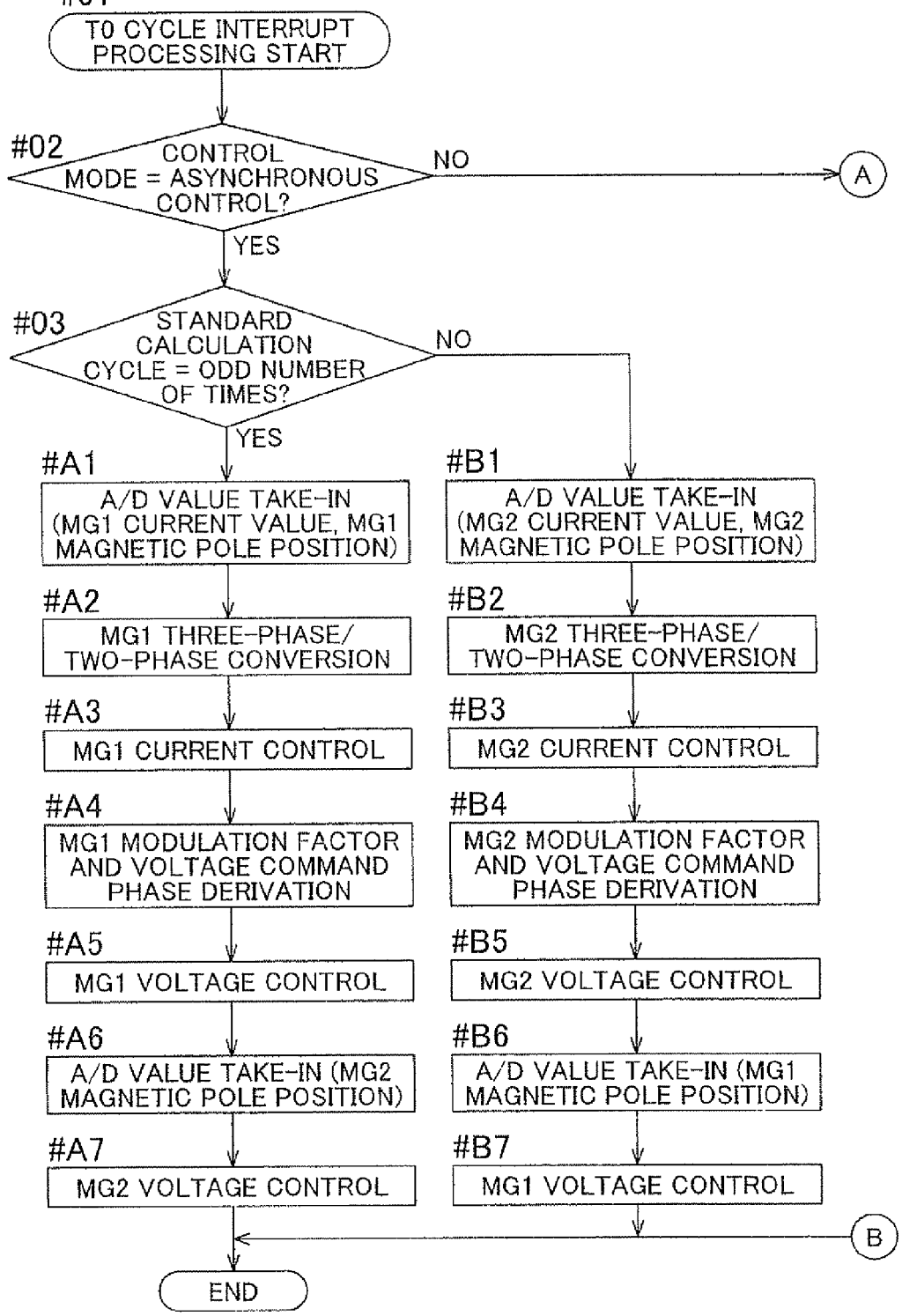
FIGS. 6A and 6B are flow charts showing procedures of electric motor control processing according to the first embodiment.
Figure 6B:
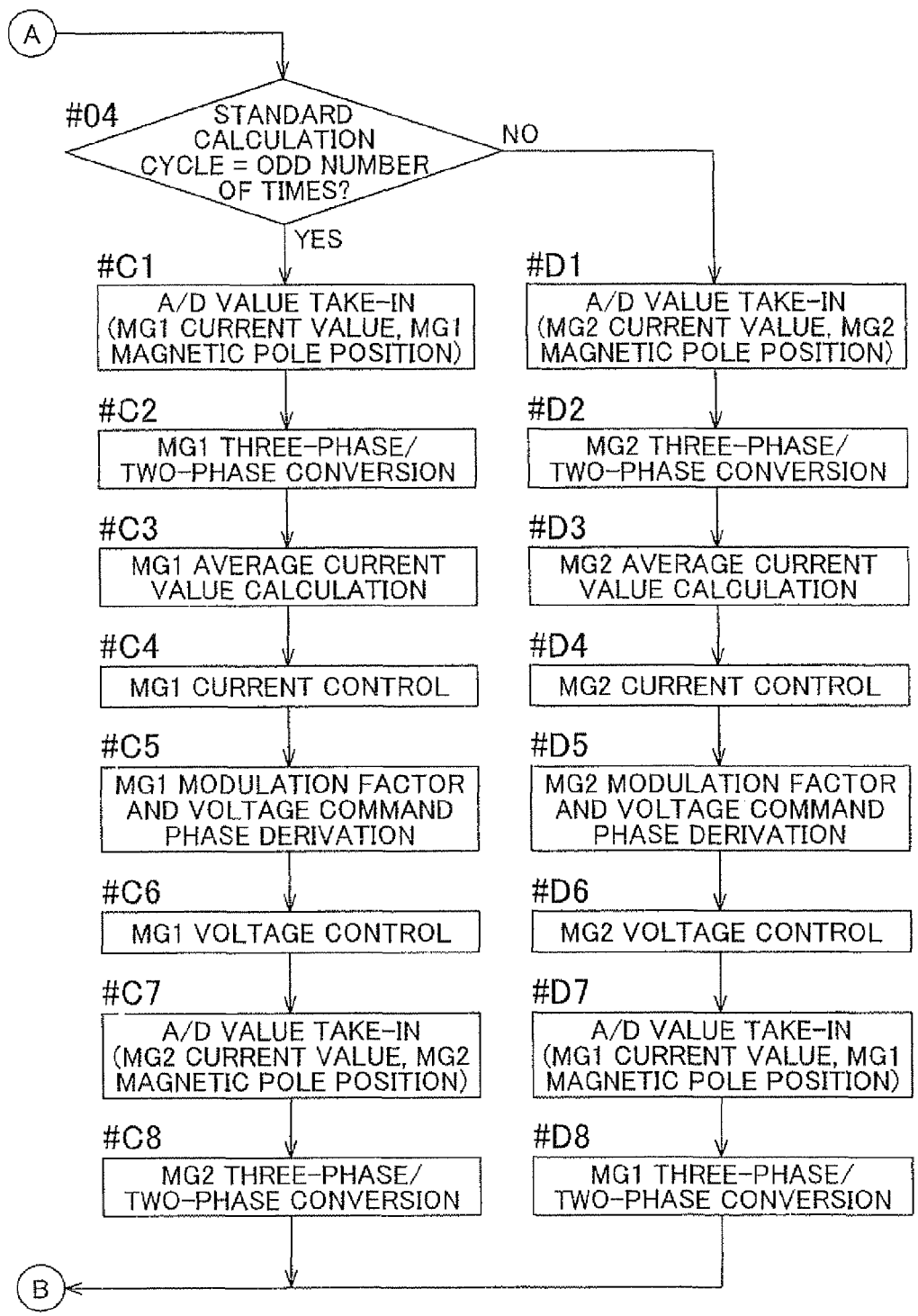

As shown in FIGS. 6A and 6B, after the interrupt processing of the CPU 61 in each the standard calculation cycle T0 is executed (step #01), the control device 2 first determines whether the present control mode determined by the mode determination unit 51 is the asynchronous control mode or the synchronous control mode (step #02), and then determines whether the standard calculation cycle T0 is repeated an odd number of times or an even number of times (step #03 or #04).

If the present control mode is the asynchronous control mode (step #02: Yes) and the standard calculation cycle T0 is repeated an odd number of times (step #03: Yes), the control device 2 performs the processing operations according to the processing cycle settings for the asynchronous control mode while giving priority to the processing for the first electric motor MG1, as shown in a first standard calculation cycle T01 and a third standard calculation cycle T03 of FIG. 7. First, the magnetic pole position take-in processing PT1 and the current value take-in processing IT1 are performed (step #A1) in which the magnetic pole position θ and the current detection values Iur, Ivr, and Iwr of the first electric motor MG1 detected first in the standard calculation cycle T0 are taken in after being converted into digital data by the A/D converter 67 (refer to FIG. 1). Next, the three-phase/two-phase conversion processing CT1 (step #A2), the current control processing IC1 (step #A3), the modulation factor and voltage command phase deriving processing MC1 (step #A4), and the voltage control processing VC1 (step #A5) are sequentially performed for the first electric motor MG1. Subsequently, the magnetic pole position take-in processing PT2 is performed (step #A6) in which the magnetic pole position θ of the second electric motor MG2 detected first in the standard calculation cycle T0 is taken in after being converted into digital data by the A/D converter 67. Next, the voltage control processing VC2 for the second electric motor MG2 is performed (step #A7). In the voltage control processing VC2 for the second electric motor MG2, the results of the modulation factor and voltage command phase deriving processing MC2 for the second electric motor MG2 that has been executed in the previous standard calculation cycle T0 (for example, in a second standard calculation cycle T02 relative to the third standard calculation cycle T03 in FIG. 7) are used without modification as the modulation factor M and the voltage command phase θv.

If the present control mode is the asynchronous control mode (step #02: Yes) and the standard calculation cycle T0 is repeated an even number of times (step #03: No), the control device 2 performs the processing operations according to the processing cycle settings for the asynchronous control mode while giving priority to the processing for the second electric motor MG2, as shown in the second standard calculation cycle T02 and a fourth standard calculation cycle T04 of FIG. 7. First, the magnetic pole position take-in processing PT2 and the current value take-in processing IT2 are performed (step #B1) in which the magnetic pole position θ and the current detection values Iur, Ivr, and Iwr of the second electric motor MG2 detected first in the standard calculation cycle T0 are taken in after being converted into digital data by the A/D converter 67 (refer to FIG. 1). Next, the three-phase/two-phase conversion processing CT2 (step #B2), the current control processing IC2 (step #B3), the modulation factor and voltage command phase deriving processing MC2 (step #134), and the voltage control processing VC2 (step #B5) are sequentially performed for the second electric motor MG2. Subsequently, the magnetic pole position take-in processing PT1 is performed (step #B6) in which the magnetic pole position θ of the first electric motor MG1 detected first in the standard calculation cycle T0 is taken in after being converted into digital data by the A/D converter 67. Next, the voltage control processing VC1 for the first electric motor MG1 is performed (step #B7). In the voltage control processing VC1 for the first electric motor MG1, the results of the modulation factor and voltage command phase deriving processing MC1 for the first electric motor MG1 that has been executed in the previous standard calculation cycle T0 (for example, in the first standard calculation cycle T01 relative to the second standard calculation cycle T02 in FIG. 7) are used without modification as the modulation factor M and the voltage command phase θv.

If the present control mode is the synchronous control mode (step #02: No) and the standard calculation cycle T0 is repeated an odd number of times (step #04: Yes), the control device 2 performs the processing operations according to the processing cycle settings for the synchronous control mode while giving priority to the processing for the first electric motor MG1, as shown in the first standard calculation cycle T01 and the third standard calculation cycle T03 of FIG. 8. First, the magnetic pole position take-in processing PT1 and the current value take-in processing IT1 are performed (step #C1) in which the magnetic pole position θ and the current detection values Iur, Ivr, and Iwr of the first electric motor MG1 detected first in the standard calculation cycle T0 are taken in after being converted into digital data by the A/D converter 67 (refer to FIG. 1). Next, the three-phase/two-phase conversion processing CT1 (step #C2), the average current value calculation processing AC1 (step #C3), the current control processing IC1 (step #C4), the modulation factor and voltage command phase deriving processing MC1 (step #C5), and the voltage control processing VC1 (step #C6) are sequentially performed for the first electric motor MG1. Here, in the average current value calculation processing AC1 for the first electric motor MG1 in the odd numbered standard calculation cycle T0, the average values are calculated by using the two-phase current detection values Idr and Iqr for two (=N) times obtained as results of the three-phase/two-phase conversion processing CT1 repeated twice (=N times), one in the standard calculation cycle T0 during which the average current value calculation processing AC1 is executed and the other in the previous even numbered standard calculation cycle T0 (for example, in the second standard calculation cycle T02 relative to the third standard calculation cycle T03 in FIG. 8), for the first electric motor MG1. Therefore, because the subsequent processing operations including the current control processing IC1 (step #C4), the modulation factor and voltage command phase deriving processing MC1 (step #C5), and the voltage control processing VC1 (step #C6) are performed based on these average current values, the voltage control processing VC1 is performed once by feeding back the current detection values for two N) times detected by repeating the current detection processing IS1 twice (=N times).

Subsequently, the magnetic pole position take-in processing PT2 and the current value take-in processing 1T2 are performed (step #C7) in which the magnetic pole position θ and the current detection values Iur, Ivr, and Iwr of the second electric motor MG2 detected first in the standard calculation cycle T0 are taken in after being converted into digital data by the A/D converter 67. Next, the three-phase/two-phase conversion processing CT2 for the second electric motor MG2 is performed (step #C8), In the odd numbered standard calculation cycle T0, the two-phase current detection values Idr and Iqr after being converted from three-phase currents to two-phase currents by calculation of the three-phase/two-phase conversion processing CT2 for the second electric motor MG2 are used when calculating the average values in the average current value calculation processing AC2 for the second electric motor MG2 in the subsequent even numbered standard calculation cycle T0 (for example, in the second standard calculation cycle T02 relative to the first standard calculation cycle T01 in FIG. 8).

If the present control mode is the synchronous control mode (step #02: No) and the standard calculation cycle T0 is repeated an even number of times (step #04: No), the control device 2 performs the processing operations according to the processing cycle settings for the synchronous control mode while giving priority to the processing for the second electric motor MG2, as shown in the second standard calculation cycle T02 and the fourth standard calculation cycle T04 of FIG. 8. First, the magnetic pole position take-in processing PT2 and the current value take-in processing IT2 are performed (step #D1) in which the magnetic pole position θ and the current detection values Iur, Ivr, and Iwr of the second electric motor MG2 detected first in the standard calculation cycle T0 are taken in after being converted into digital data by the A/D converter 67 (refer to FIG. 1). Next, the three-phase/two-phase conversion processing CT2 (step #D2), the average current value calculation processing AC2 (step #D3), the current control processing IC2 (step #D4), the modulation factor and voltage command phase deriving processing MC2 (step #D5), and the voltage control processing VC2 (step #D6) are sequentially performed for the second electric motor MG2. Here, in the average current value calculation processing AC2 for the second electric motor MG2 in the even numbered standard calculation cycle T0, the average values are calculated by using the two-phase current detection values Idr and Iqr for two (=N) times obtained as results of the three-phase/two-phase conversion processing CT2 repeated twice (=N times), one in the standard calculation cycle T0 during which the average current value calculation processing AC2 is executed and the other in the previous odd numbered standard calculation cycle T0 (for example, in the first standard calculation cycle T01 relative to the second standard calculation cycle T02 in FIG. 8), for the second electric motor MG2. Therefore, because the subsequent processing operations including the current control processing IC2 (step #D4), the modulation factor and voltage command phase deriving processing MC2 (step #D5), and the voltage control processing VC2 (step #D6) are performed based on these average current values, the voltage control processing VC2 is performed once by feeding back the current detection values for two (=N) times detected by repeating the current detection processing IS2 twice (=N times).

Subsequently, the magnetic pole position take-in processing PT1 and the current value take-in processing IT1 are performed (step #D7) in which the magnetic pole position θ and the current detection values Iur, Ivr, and Iwr of the first electric motor MG1 detected first in the standard calculation cycle T0 are taken in after being converted into digital data by the A/D converter 67. Next, the three-phase/two-phase conversion processing CT1 for the first electric motor MG1 is performed (step #D8). In the even numbered standard calculation cycle T0, the two-phase current detection values Idr and Iqr after being converted from three-phase currents to two-phase currents by calculation of the three-phase/two-phase conversion processing CT1 for the first electric motor MG1 are used when calculating the average values in the average current value calculation processing AC1 for the first electric motor MG1 in the subsequent odd numbered standard calculation cycle T0 (for example, in the third standard calculation cycle T03 relative to the second standard calculation cycle T02 in FIG. 8).

As described above, if the synchronous control mode is selected, the average current value calculation processing AC (AC1 and AC2) calculates the average values of the current detection values (here, the two-phase current detection values Idr and Iqr) for two (=N) times obtained as results of the current detection processing IS (IS1 and IS2) performed in every standard calculation cycle T0, and these average values are used to perform the current control processing IC (IC1 and IC2) and the voltage control processing VC (VC1 and VC2) in a cycle of twice (=N times) longer than the standard calculation cycle T0. Accordingly, in the case of performing the current control processing IC (IC1 and IC2) and the voltage control processing VC (VC1 and VC2) in a relatively long cycle that is twice (=N times) longer than the standard calculation cycle T0 while performing the current detection processing IS (IS1 and IS2) in a short cycle of the standard calculation cycle T0, the current control processing IC (IC1 and IC2) and the voltage control processing VC (VC1 and VC2) can be performed by appropriately feeding back the current detection values for two (=N) times detected by repeating the current detection processing IS (IS1 and IS2) twice (=N times). Consequently, in the synchronous control mode in which the rotational speed of the rotor of the electric motor MG is relatively high and the aliasing in the current sampling tends to be liable to occur, the cycle (sampling cycle) of the current detection processing IS (IS1 and IS2) can be shortened, and the aliasing in the current sampling can be suppressed from occurring by appropriately reflecting in the control the current detection values detected in the short cycle.

Although the calculation load of the CPU core 62 increases by reducing the cycle of the current detection processing IS (IS1 and IS2) to be shorter than that in the asynchronous control mode, the calculation load required for the voltage control processing VC (VC1 and VC2) is reduced by a corresponding amount by extending the cycle of the voltage control processing VC (VC1 and VC2) to be twice (=N times) that of the asynchronous control mode, thereby limiting the overall calculation load of the control device 2 within the processing capacity of the CPU core 62. As described above, in the synchronous control mode, unlike in the asynchronous control mode, the switching control signals need not be output in every carrier cycle TC. Therefore, few problems occur even if the cycle of the voltage control processing VC (VC1 and VC2) is prolonged. Accordingly, even if the rotational speed of the electric motor MG is high, the aliasing in the current sampling can be suppressed from occurring while using the CPU core 62 with a limited processing capacity.

On the other hand, if the asynchronous control mode is selected, it is possible to perform the voltage control processing VC (VC1 and VC2) in the asynchronous control mode appropriately in a short cycle in which the control signals for switching on or off are output basically in every carrier cycle TC, by performing the voltage control processing VC (VC1 and VC2) in every standard calculation cycle T0 as described above. Contrary to the case in which the synchronous control mode is selected, the calculation load of the CPU core 62 increases by shortening the cycle of the voltage control processing VC (VC1 and VC2). However, the calculation load is reduced by performing the current detection processing IS (IS1 and IS2) and the processing associated therewith, including the current value take-in processing IT (IT1 and IT2), the three-phase/two-phase conversion processing CT (CT1 and CT2), the current control processing IC (IC1 and IC2), and the modulation factor and voltage command phase deriving processing MC (MC1 and MC2), in a cycle of twice (=N times) longer than the standard calculation cycle, thereby limiting the overall calculation load of the control device 2 within the processing capacity of the CPU core 62. In this case, because the asynchronous control mode is selected in the case in which the rotational speed of the electric motor MG is relatively low and the frequency of the carrier is sufficiently higher than the frequency of the alternating-current voltage command values Vu, Vv, and Vw, the aliasing in the current sampling hardly occurs even if the cycle (sampling cycle) of the current detection processing IS (IS1 and IS2) is extended to be longer to some extent than the carrier cycle TC.

2. Second Embodiment

Next, a second embodiment of the control device 2 of the electric motor drive apparatus 1 according to the present invention will be described. The electric motor drive apparatus 1 and the control device 2 according to the present embodiment differ from those of the first embodiment in that only one electric motor MG is provided as a controlled object in the present embodiment, whereas the two electric motors MG1 and MG2 are provided as controlled objects in the first embodiment. Therefore, although illustration is omitted, the hardware structure differs from that of the first embodiment in that the electric motor drive apparatus 1 is provided with one inverter 6, one current sensor 7, and one rotation sensor 8. In addition, the software structure differs from that of the first embodiment in that the control device 2 is structured so as to control one electric motor MG. Description will be made below of the processing cycle of each of the units depending on the control mode and of the procedures of the electric motor control processing that are the main points of difference. Note that the points not particularly described are basically the same as those of the first embodiment.

2-1. Processing Cycle of Each Unit Depending on Control Mode

Figure 10:
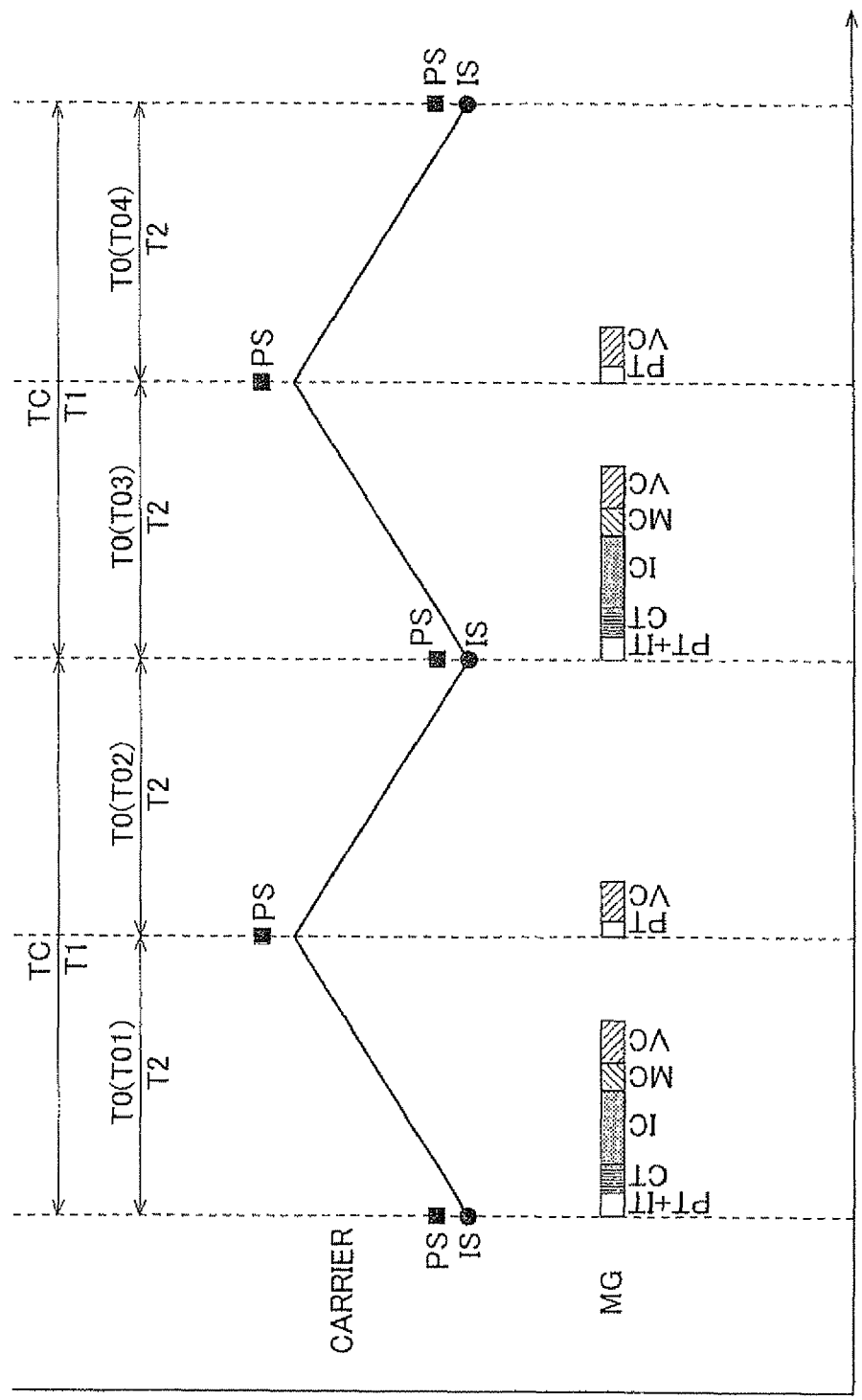
FIG. 10 is a time chart in the case of control in an asynchronous control mode according to the second embodiment.

First, description will be made of setting of the processing cycle of each of the units of the control device 2 in accordance with the control mode according to the present embodiment. In the present embodiment, the control device 2 is structured so as to perform the calculation processing for the current feedback control of the single electric motor MG with the single CPU core 62. Accordingly, if the asynchronous control mode is selected, the control device 2 performs the voltage control processing VC in every standard calculation cycle T0, and also performs the current detection processing IS in a cycle of twice (=N times) longer than the standard calculation cycle T0, thus performing the voltage control processing VC twice (=N times) by feeding back the current detection values Iur, Ivr, and Iwr detected by performing the current detection processing IS once, as shown in FIG. 10. On the other hand, if the synchronous control mode is selected, the control device 2 performs the current detection processing IS in every standard calculation cycle T0, and also performs the voltage control processing VC in a cycle of twice (=N times) longer than the standard calculation cycle T0, thus performing the voltage control processing VC once by feeding back the current detection values Iur, Ivr, and Iwr for two (=N) times detected by repeating the current detection processing IS twice (=N times), as shown in FIG. 11. Note that, in FIGS. 10 and 11, the current detection cycle in which the current detection processing IS is performed is indicated as "T1" and the voltage control cycle in which the voltage control processing VC is performed is indicated as "T2", in addition to the carrier cycle TC and the standard calculation cycle T0.

The control device 2 also switches the cycles of other processing operations corresponding to switching of the current detection cycle T1 and the voltage control cycle T2. Specifically, in the same manner as in the first embodiment, the current value take-in processing IT and the three-phase/two-phase conversion processing CT are performed after the current detection processing IS in the same cycle as that of the current detection processing IS. That is, if the asynchronous control mode is selected, the control device 2 performs the current value take-in processing IT and the three-phase/two-phase conversion processing CT in a cycle of twice (=N times) longer than the standard calculation cycle T0, as shown in FIG. 10, whereas if the synchronous control mode is selected, the control device 2 performs the current value take-in processing IT and the three-phase/two-phase conversion processing CT in every standard calculation cycle T0, as shown in FIG. 11.

As shown in FIGS. 10 and 11, the magnetic pole position detection processing PS and the magnetic pole position take-in processing PT are performed in every standard calculation cycle T0 regardless of the control mode. The average current value calculation processing AC is not performed in the asynchronous control mode, but performed in a cycle of twice (=N times) longer than the standard calculation cycle T0 if the synchronous control mode is selected. The current control processing IC is performed in a cycle of twice (=N times) longer than the standard calculation cycle T0 regardless of the control mode. However, the contents of the current control processing IC differ depending on the control mode. In the asynchronous control mode, the current control processing IC is simply performed in the same cycle as that of the current detection processing IS, whereas in the synchronous control mode, the current control processing IC is performed in a cycle of twice (=N times) longer than the cycle of the current detection processing IS by using the average values of the current detection values Idr and Iqr for two N) times in each cycle of the current control processing IC. The modulation factor and voltage command phase deriving processing MC is performed in a cycle of twice (=N times) longer than the standard calculation cycle T0 regardless of the control mode. That is, the control device 2 performs the modulation factor and voltage command phase deriving processing MC after the current control processing IC in the same cycle as that of the current control processing IC. Thus, the cycles of the processing operations are basically the same as those of the first embodiment.

In the present embodiment, there are also processing operations to be performed in a cycle of twice (=N times) longer than the standard calculation cycle T0 in the same manner as in the first embodiment. Those processing operations are performed once in every two standard calculation cycles T0. Therefore, also in the present embodiment, the control device 2 monitors whether the standard calculation cycle T0 is repeated an odd number of times or an even number of times, and, for example, performs the processing to be performed in a cycle of twice (=N times) longer than the standard calculation cycle T0 in the odd numbered cycle, but does not perform such processing in the even numbered cycle, depending on the monitoring result. Further, the control device 2 performs such processing to be performed in every standard calculation cycle T0, regardless of whether the cycle is executed an odd number of times or an even number of times.

2-2. Procedures of Electric Motor Control Processing

Next, procedures of the electric motor control processing according to the present embodiment will be described with reference to a flow chart in FIG. 9 and the time charts in FIGS. 10 and 11. Also in the present embodiment, the calculation processing in each of the functional units of the control device 2 is performed based on the standard calculation cycle T0 serving as the cycle of the interrupt processing by the CPU 61. In addition, the magnetic pole position detection processing PS is performed in every standard calculation cycle T0, regardless of the control mode. On the other hand, the current detection processing IS is performed in a cycle of twice (=N times) longer than the standard calculation cycle T0 if the asynchronous control mode is selected, or in every standard calculation cycle T0 if the synchronous control mode is selected.

Figure 9:
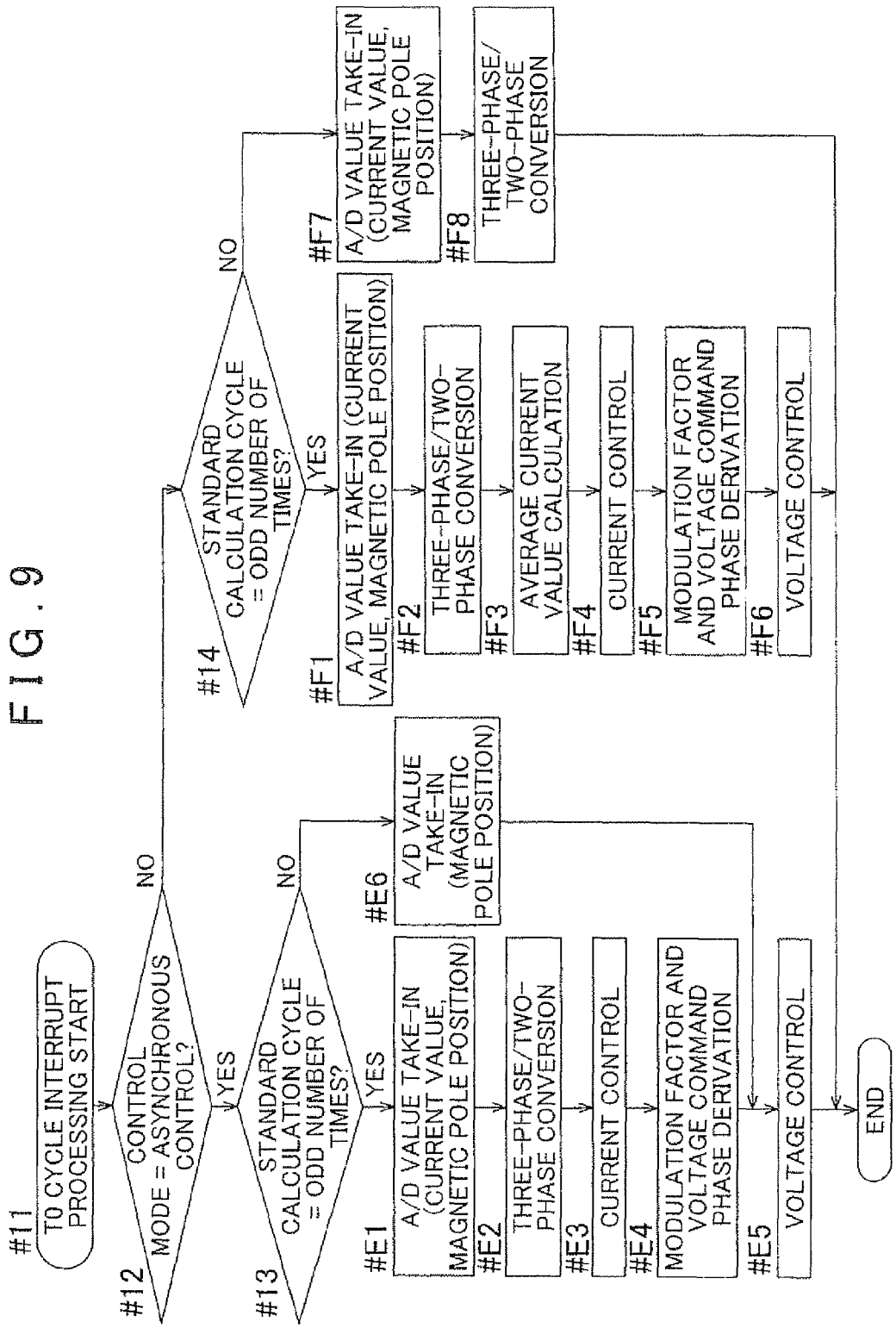
FIG. 9 is a flow chart showing procedures of electric motor control processing according to a second embodiment.

As shown in FIG. 9, after the interrupt processing of the CPU 61 in each standard calculation cycle T0 is executed (step #11), the control device 2 first determines whether the present control mode determined by the mode determination unit 51 is the asynchronous control mode or the synchronous control mode (step #12), and then determines whether the standard calculation cycle T0 is repeated an odd-number of times or an even number of times (step #13 or #14).

If the present control mode is the asynchronous control mode (step #12: Yes) and the standard calculation cycle T0 is repeated an odd number of times (step #13: Yes), the control device 2 performs both the processing to be performed in a cycle of twice (=N times) longer than the standard calculation cycle T0 and the processing to be performed in every standard calculation cycle T0 according to the processing cycle settings for the asynchronous control mode, as shown in the first standard calculation cycle T01 and the third standard calculation cycle T03 of FIG. 10. First, the magnetic pole position take-in processing PT and the current value take-in processing IT are performed (step #E1) in which the magnetic pole position θ and the current detection values Iur, Ivr, and Iwr of the electric motor MG detected first in the standard calculation cycle T0 are taken in after being converted into digital data by the A/D converter 67 (refer to FIG. 1). Next, the three-phase/two-phase conversion processing CT (step #E2), the current control processing IC (step #E3), the modulation factor and voltage command phase deriving processing MC (step #E4), and the voltage control processing VC (step #E5) are sequentially performed.

If the present control mode is the asynchronous control mode (step #12: Yes) and the standard calculation cycle T0 is repeated an even number of times (step #13: No), the control device 2 performs only the processing that is performed in every standard calculation cycle T0 according to the processing cycle settings for the asynchronous control mode, as shown in the second standard calculation cycle T02 and the fourth standard calculation cycle T04 of FIG. 10. First, the magnetic pole position take-in processing PT is performed (step #E6) in which the magnetic pole position θ of the electric motor MG detected first in the standard calculation cycle T0 is taken in after being converted into digital data by the A/D converter 67. Next, the voltage control processing VC is performed (step #E5). In the voltage control processing VC, the results of the modulation factor and voltage command phase deriving processing MC that has been executed in the previous standard calculation cycle T0 (for example, in the first standard calculation cycle T01 relative to the second standard calculation cycle T02 in FIG. 10) are used without modification as the modulation factor M and the voltage command phase θv.

If the present control mode is the synchronous control mode (step #12: No) and the standard calculation cycle T0 is repeated an odd number of times (step #14: Yes), the control device 2 performs both the processing to be performed in a cycle of twice (=N times) longer than the standard calculation cycle T0 and the processing to be performed in every standard calculation cycle T0 according to the processing cycle settings for the synchronous control mode, as shown in the first standard calculation cycle T01 and the third standard calculation cycle T03 of FIG. 11. First, the magnetic pole position take-in processing PT and the current value take-in processing IT are performed (step #F1) in which the magnetic pole position θ and the current detection values Iur, Ivr, and Iwr of the electric motor MG detected first in the standard calculation cycle T0 are taken in after being converted into digital data by the A/D converter 67 (refer to FIG. 1). Next, the three-phase/two-phase conversion processing CT (step #F2), the average current value calculation processing AC (step #F3), the current control processing IC (step #F4), the modulation factor and voltage command phase deriving processing MC (step #F5), and the voltage control processing VC (step #F6) are sequentially performed. Here, in the average current value calculation processing AC in the odd numbered standard calculation cycle T0, the average values are calculated by using the two-phase current detection values Idr and Iqr for two (=N) times obtained as results of the three-phase/two-phase conversion processing CT repeated twice (=N times), one in the standard calculation cycle T0 during which the average current value calculation processing AC is executed and the other in the previous even numbered standard calculation cycle T0 (for example, in the second standard calculation cycle T02 relative to the third standard calculation cycle T03 in FIG. 11). Therefore, because the subsequent processing operations including the current control processing IC (step #F4), the modulation factor and voltage command phase deriving processing MC (step #F5), and the voltage control processing VC (step #F6) are performed based on these average current values, the voltage control processing VC is performed once by feeding back the current detection values for two (=N) times detected by repeating the current detection processing IS twice (=N times).

If the present control mode is the synchronous control mode (step #12: No) and the standard calculation cycle T0 is executed an even number of times (step #14: No), the control device 2 performs only the processing to be performed in every standard calculation cycle T0 according to the processing cycle settings for the synchronous control mode, as shown in the second standard calculation cycle T02 and the fourth standard calculation cycle T04 of FIG. 11. First, the magnetic pole position take-in processing PT and the current value take-in processing IT are performed (step #F7) in which the magnetic pole position θ and the current detection values Iur, Ivr, and Iwr of the electric motor MG detected first in the standard calculation cycle T0 are taken in after being converted into digital data by the A/D converter 67. Next, the three-phase/two-phase conversion processing CT is performed (step #F8). In the even numbered standard calculation cycle T0, the two-phase current detection values Idr and Iqr after being converted from three-phase currents to two-phase currents by calculation of the three-phase/two-phase conversion processing CT are used when calculating the average values in the average current value calculation processing AC in the subsequent odd numbered standard calculation cycle T0 (for example, in the third standard calculation cycle T03 relative to the second standard calculation cycle T02 in FIG. 11).

Also in the present embodiment, in the same manner as in the first embodiment, by employing the structure as described above, the cycle (sampling cycle) of the current detection processing IS can be shortened, and the aliasing in the current sampling can be suppressed from occurring by appropriately reflecting in the control the current detection values detected in the short cycle, in the synchronous control mode in which the rotational speed of the rotor of the electric motor MG is relatively high and the aliasing in the current sampling tends to be liable to occur. Although the calculation load of the CPU core 62 is increased by reducing the cycle of the current detection processing IS to be shorter than that in the asynchronous control mode, a corresponding amount of the calculation load is reduced by extending the cycle of the voltage control processing VC to twice (=N times) that of the asynchronous control mode, thereby limiting the overall calculation load of the control device 2 within the processing capacity of the CPU core 62. On the other hand, in the asynchronous control mode in which the aliasing in the current sampling hardly occurs even if the cycle (sampling cycle) of the current detection processing IS is longer to some extent than the carrier cycle TC, the calculation load is reduced by performing the current detection processing IS and the processing associated therewith in a cycle of twice (=N times) longer than the standard calculation cycle T0, while enabling to appropriately execute the PWM control in the asynchronous control mode by, instead, performing the voltage control processing VC in every standard calculation cycle T0.

3. Third Embodiment

Next, a third embodiment of a control device 2 of an electric motor drive apparatus 1 according to the present invention will be described. Although illustration is omitted, the electric motor drive apparatus 1 and the control device 2 according to the present embodiment differ from those of the first embodiment in the contents of control for feeding back to the voltage control processing VC the current detection values Iur, Ivr, and Iwr obtained in every standard calculation cycle T0 by performing the current detection processing IS (IS1 and IS2) in every standard calculation cycle T0, if the synchronous control mode is selected. Consequently, the software structure differs from that of the first embodiment in that a current control unit 13 is not provided with an average value calculation unit 21. Since the two electric motors MG1 and MG2 are also provided as controlled objects in the present embodiment, the hardware structure is the same as that of the first embodiment. In addition, in the present embodiment, the processing cycles of the units and the procedures of the electric motor control processing in the asynchronous control mode are the same as those of the first embodiment. Accordingly, the description of the present embodiment uses FIG. 7 as a time chart for showing the processing cycles of the units in the asynchronous control mode. The description will be made below of the processing cycle of each of the units depending on the control mode and of the procedures of the electric motor control processing that are the main points of difference. Note that the points not particularly described are basically the same as those of the first embodiment.

3-1. Processing Cycle of Each Unit Depending on Control Mode

First, description will be made of setting of the processing cycle of each of the units of the control device 2 depending on the control mode according to the present embodiment. The control device 2 is structured so as to switch the setting of the processing cycle of each of the units depending on whether the control mode selected by the mode determination unit 51 is the synchronous control mode or the asynchronous control mode. In the present embodiment, the control device 2 switches the setting of the cycle of the current control processing IC (IC1 and IC2) performed by the current control unit 13, in addition to the settings of the cycle of the current detection processing IS (IS1 and IS2) performed by the current sensors 7 (7a and 7b) and the cycle of the voltage control processing VC (VC1 and VC2) performed by the voltage control unit 23, depending on the control mode.

Figure 13:
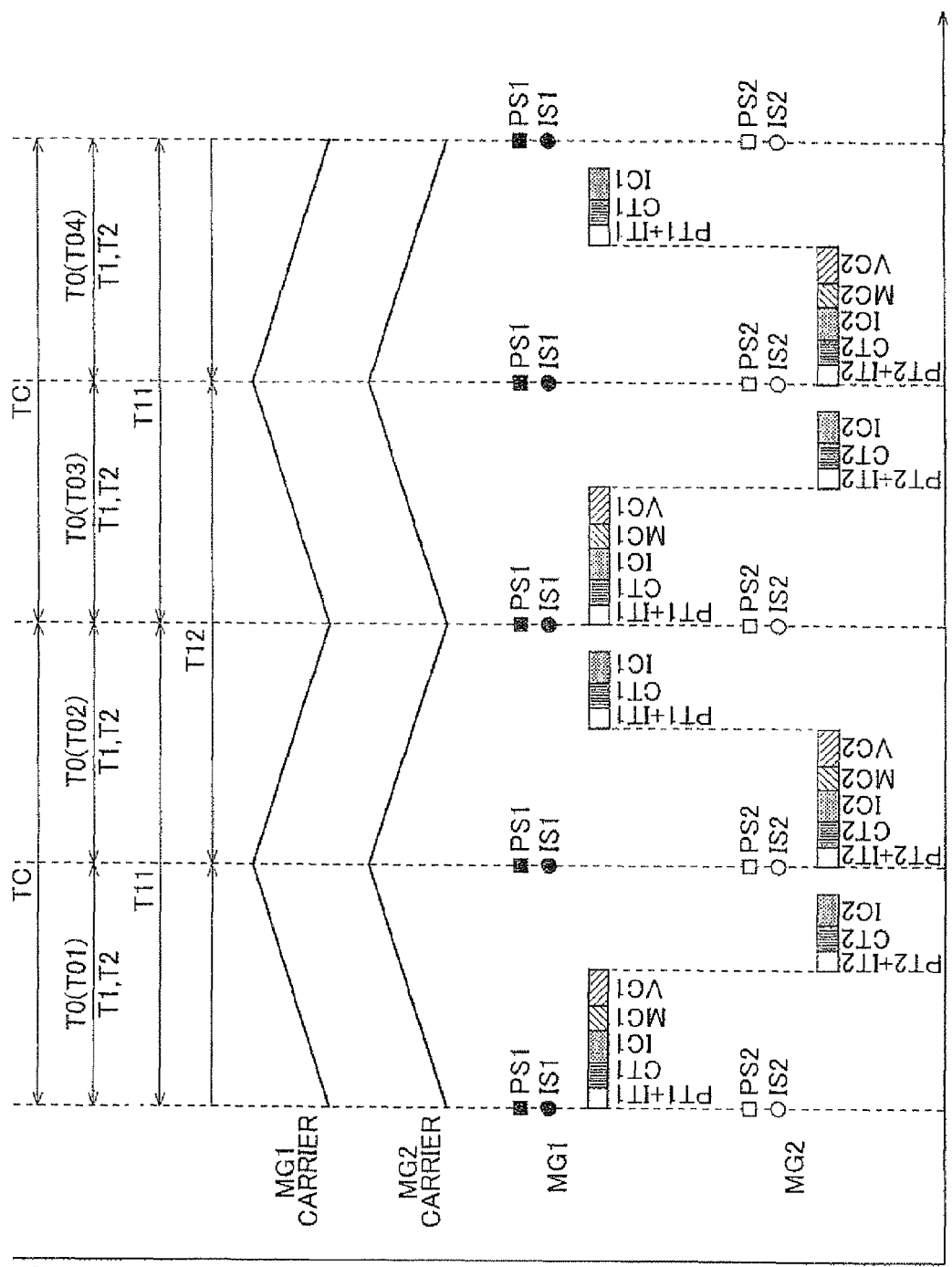
FIG. 13 is a time chart in the case of control in a synchronous control mode according to the third embodiment.

In the present embodiment, in the same manner as in the first embodiment, the control device 2 is structured so as to perform the calculation processing for the current feedback control of the two (=N) electric motors MG1 and MG2 with the single CPU core 62. Accordingly, if the asynchronous control mode is selected, as shown in FIG. 7, the control device 2 performs the voltage control processing VC (VC1 and VC2) for each of the two N) electric motors MG1 and MG2 in every standard calculation cycle T0 sequentially in the same standard calculation cycle T0, and also performs the current detection processing IS (IS1 and IS2) for each of the two N) electric motors MG1 and MG2 in a cycle of twice N times) longer than the standard calculation cycle T0 at mutually different times. Thus, the control device 2 performs the voltage control processing VC (VC1 and VC2) twice (=N times) by feeding back the current detection values Iur, Ivr, and Iwr detected by performing the current detection processing IS (IS1 and IS2) once for each of the two (=N) electric motors MG1 and MG2. On the other hand, if the synchronous control mode is selected, as shown in FIG. 13, the control device 2 performs the current detection processing IS (IS1 and IS2) for each of the two (=N) electric motors MG1 and MG2 in every standard calculation cycle T0, and also performs the voltage control processing VC (VC1 and VC2) for each of the two (=N) electric motors MG1 and MG2 in a cycle of twice (=N times) longer than the standard calculation cycle T0 in the mutually different standard calculation cycles T0. Thus, the control device 2 performs the voltage control processing VC (VC1 and VC2) once by feeding back the current detection values Ito, Ivr, and Iwr for two (=N) times detected by repeating the current detection processing IS (IS1 and IS2) twice (=N times). Regarding the current detection cycle that is the cycle at which the current detection processing IS (IS1 and 1S2) is performed and the voltage control cycle that is the cycle at which the voltage control processing VC (VC1 and VC2) is performed, it should be noted that, in FIG. 13 in the same manner as in FIGS. 7 and 8, the current detection cycle for the first electric motor MG1 is denoted as "T11"; the current detection cycle for the second electric motor MG2 is denoted as "T12"; the voltage control cycle for the first electric motor MG1 is denoted as "T21"; and the voltage control cycle for the second electric motor MG2 is denoted as "T22".

The control device 2 also switches the cycles of other processing operations corresponding to switching of the current detection cycle T1 and the voltage control cycle T2. Specifically, in the same manner as in the first embodiment, the current value take-in processing IT (IT1 and IT2) and the three-phase/two-phase conversion processing CT (CT1 and CT2) for each of the two electric motors MG1 and MG2 are performed after the current detection processing IS (IS1 and IS2) for each of the two electric motors MG1 and MG2 in the same cycle as that of the current detection processing IS (IS1 and IS2). That is, if the asynchronous control mode is selected, the control device 2 performs the current value take-in processing IT (IT1 and IT2) and the three-phase/two-phase conversion processing CT (CT1 and CT2) for each of the two electric motors MG1 and MG2 in a cycle of twice (=N times) longer than the standard calculation cycle T0 in the mutually different standard calculation cycles T0 as shown in FIG. 7; whereas if the synchronous control mode is selected, the control device 2 performs the current value take-in processing IT (IT1 and IT2) and the three-phase/two-phase conversion processing CT (CT1 and CT2) for each of the two electric motors MG1 and MG2 in every standard calculation cycle T0, as shown in FIG. 13.

In addition, in the present embodiment, unlike in the first embodiment, the control device 2 also switches the cycle of the current control processing IC (IC1 and IC2) corresponding to switching of the current detection cycle T1 and the voltage control cycle T2, that is, corresponding to the control mode. Specifically, the current control processing IC (IC1 and IC2) for each of the two electric motors MG1 and MG2 is performed after the three-phase/two-phase conversion processing CT (CT1 and CT2) for each of the two electric motors MG1 and MG2 in the same cycle as that of the current detection processing IS (IS1 and IS2). Accordingly, if the asynchronous control mode is selected, the control device 2 performs the current control processing IC (IC1 and IC2) for each of the two electric motors MG1 and MG2 in a cycle of twice (=N times) longer than the standard calculation cycle T0 in the mutually different standard calculation cycles T0, as shown in FIG. 7; whereas if the synchronous control mode is selected, the control device 2 performs the current control processing IC (IC1 and IC2) for each of the two electric motors MG1 and MG2 in every standard calculation cycle T0, as shown in FIG. 13.

Here, as described above, the current control processing IC (IC1 and IC2) is a process to determine the two-phase voltage command values Vd and Vq serving as the first voltage command values by performing the proportional control and the integral control based on the deviations between the two-phase current detection values Idr and Iqr after being converted from three-phase currents to two-phase currents by the three-phase/two-phase conversion processing CT (CT1 and CT2), and the d-axis current command value Id and the q-axis current command value Iq serving as the two-phase current command values. Therefore, the two-phase voltage command values Vd and Vq derived by the current control processing IC (IC1 and IC2) include, as integral terms of the integral control, values depending on an integral gain and the integral values of deviations between the current detection values Idr and Iqr, and the current command values Id and Iq for a plurality of times. If the synchronous control mode is selected, the voltage control processing VC (VC1 and VC2) is performed once whereas the current control processing IC (IC1 and IC2) is performed twice. Therefore, the voltage control processing VC (VC1 and VC2) is performed based on the two-phase voltage command values Vd and Vq in which the current detection values Idr and Iqr for two (=N) times are reflected in integral terms by the current control processing IC (IC1 and IC2) repeated twice (=N times). Consequently, the voltage control processing VC (VC1 and VC2) can be performed by appropriately feeding back the current detection values Idr and Iqr for two (=N) times. Note that, although depending on the setting of the period of integration, it is also preferable to perform the voltage control processing VC (VC1 and VC2) by reflecting the current detection values for two N) or more times in the two-phase voltage command values Vd and Vq. As a matter of course, also in the case that the asynchronous control mode is selected, the current detection values Idr and Iqr for a plurality of times are reflected in the integral terms of the two-phase voltage command values Vd and Vq derived by the current control processing IC (IC1 and IC2).

As shown in FIGS. 7 and 13, the magnetic pole position detection processing PS (PS1 and PS2) and the magnetic pole position take-in processing PT (PT1 and PT2) for each of the two electric motors MG1 and MG2 are performed in every standard calculation cycle T0 regardless of the control mode. The modulation factor and voltage command phase deriving processing MC (MC1 and MC2) for each of the two electric motors MG1 and MG2 is performed in a cycle of twice (=N times) longer than the standard calculation cycle T0 in the mutually different standard calculation cycles T0, regardless of the control mode. If the synchronous control mode is selected, the modulation factor and voltage command phase deriving processing MC (MC1 and MC2) is performed once whereas the current control processing IC (IC1 and IC2) is performed twice. Therefore, the modulation factor and voltage command phase deriving processing MC (MC1 and MC2) is performed based on the two-phase voltage command values Vd and Vq in which the current detection values Idr and Iqr for two (=N) times are reflected in integral terms, thus deriving the modulation factor M and the voltage command phase θv. Then, the voltage control processing VC (VC1 and VC2) is performed based on the modulation factor M and the voltage command phase θv thus derived, resulting in performing the voltage control processing VC (VC1 and VC2) based on the two-phase voltage command values Vd and Vq in which the current detection values Idr and Iqr for two (=N) times are reflected in integral terms, as described above.

As described above, in the present embodiment, if the synchronous control mode is selected, the modulation factor and voltage command phase deriving processing MC (MC1 and MC2) as well as the voltage control processing VC (VC1 and VC2) is performed for each of the two (=N) electric motors MG1 and MG2 in a cycle of twice (=N times) longer than the standard calculation cycle T0. If the asynchronous control mode is selected, the current value take-in processing IT (IT1 and IT2), the three-phase/two-phase conversion processing CT (CT1 and CT2), the current control processing IC (IC1 and IC2), and the modulation factor and voltage command phase deriving processing MC (MC1 and MC2), as well as the current detection processing IS (IS1 and IS2), are performed for each of the two (=N) electric motors MG1 and MG2 in a cycle of twice (=N times) longer than the standard calculation cycle T0. In addition, as shown in FIGS. 7 and 13, the processing operations performed for each of the two (=N) electric motors MG1 and MG2 in a cycle of twice (=N times) longer than the standard calculation cycle T0 either in the mutually different standard calculation cycles T0 or in the standard calculation cycle T0 as described above are alternately executed in every standard calculation cycle T0. Therefore, in the present embodiment, the control device 2 monitors whether the standard calculation cycle T0 is repeated an odd number of times or an even number of times, and, for example, performs the processing for the first electric motor MG1 in the odd numbered cycle and the processing for the second electric motor MG2 in the even numbered cycle, depending on the monitoring result, In this case, the cycle of the processing for the first electric motor MG1 and the cycle of the processing for the second electric motor MG2 are shifted with respect to each other by a half of the cycle (here, equal to the standard calculation cycle T0) of the processing. In addition, for the processing to be performed in every standard calculation cycle T0, the control device 2 first performs the processing for the first electric motor MG1 and then performs the processing for the second electric motor MG2 in the odd numbered cycle, whereas the control device 2 first performs the processing for the second electric motor MG2 and then performs the processing for the first electric motor MG1 in the even numbered cycle. Note that, as a matter of course, the setting can be changed as appropriate as to which of the two electric motors MG1 and MG2 is to be subjected to the processing in either of the odd numbered and the even numbered standard calculation cycles T0.

3-2. Procedures of Electric Motor Control Processing

Next, procedures of the electric motor control processing according to the present embodiment will be described with reference to a flow chart in FIGS. 12A and 12B and the time charts in FIGS. 7 and 13. Also in the present embodiment, the calculation processing in each of the functional units of the control device 2 is performed based on the standard calculation cycle T0 serving as the cycle of the interrupt processing by the CPU 61. In addition, the magnetic pole position detection processing PS is performed in every standard calculation cycle T0, regardless of the control mode. On the other hand, the current detection processing IS is performed in a cycle of twice N times) longer than the standard calculation cycle T0 at mutually different times if the asynchronous control mode is selected, or in every standard calculation cycle T0 if the synchronous control mode is selected.

Figure 12A:
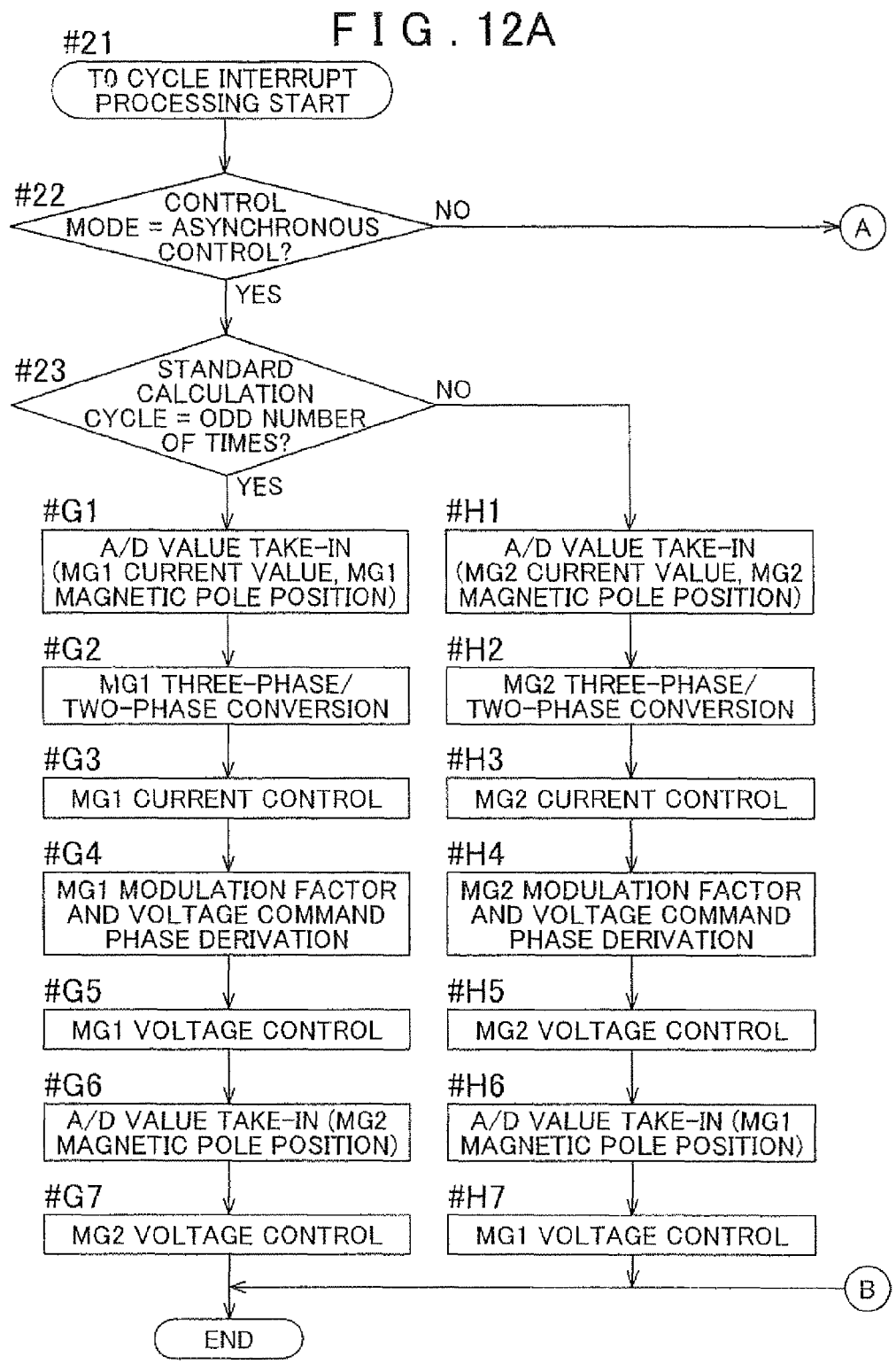
FIGS. 12A and 12B are flow charts showing procedures of electric motor control processing according to a third embodiment.
Figure 12B:
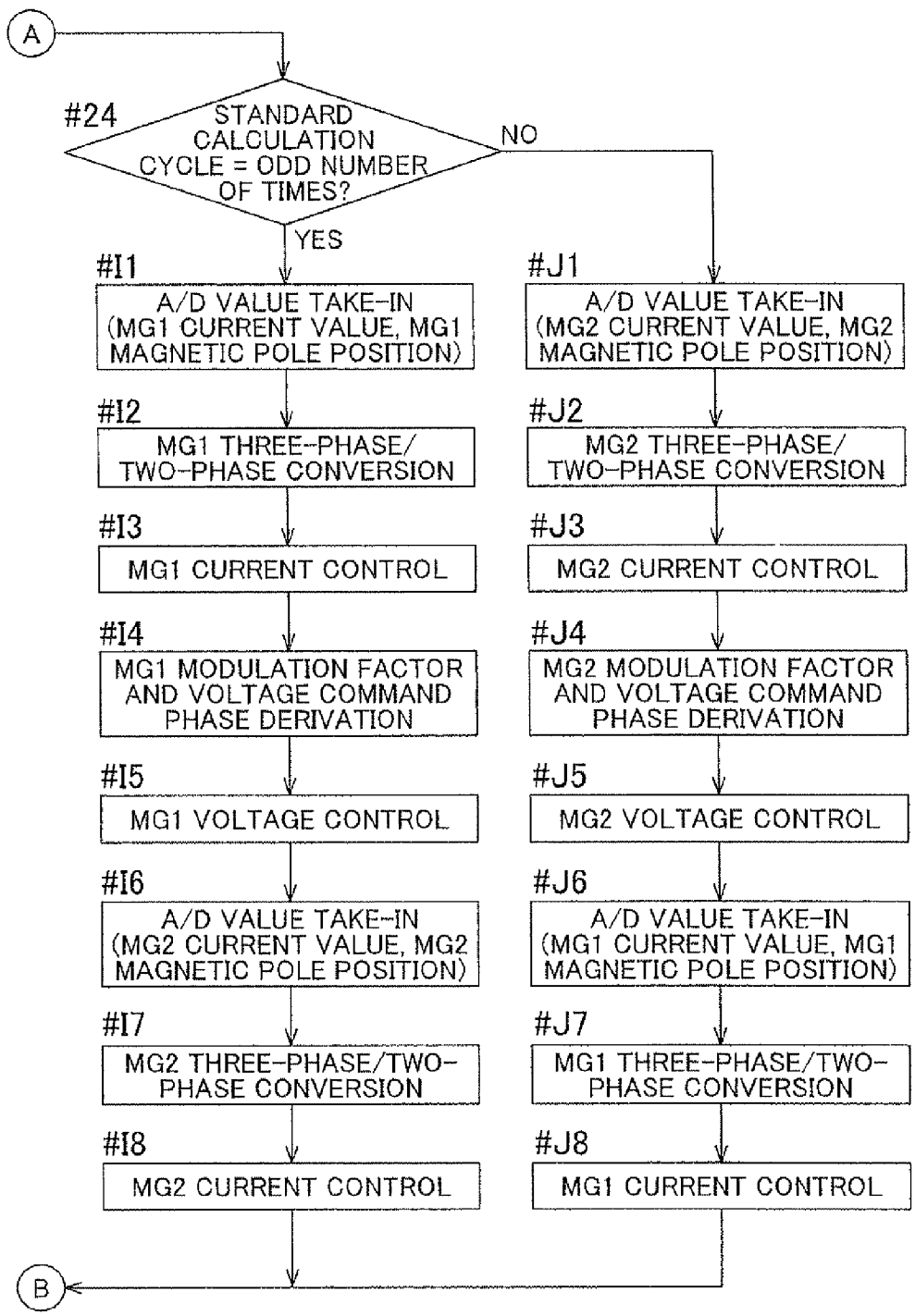

As shown in FIGS. 12A and 12B, after the interrupt processing of the CPU 61 in every standard calculation cycle T0 is executed (step #21), the control device 2 first determines whether the present control mode determined by the mode determination unit 51 is the asynchronous control mode or the synchronous control mode (step #22), and then determines whether the standard calculation cycle T0 is repeated an odd number of times or an even number of times (step #23 or #24). If the present control mode is the asynchronous control mode (step #22: Yes), the processing cycles of the units and the procedures of the electric motor control processing are the same as those of the first embodiment. Accordingly, the processing of steps #G1 to #G7, and steps #H1 to #H7 in the flow charts of FIGS. 12A and 12B is the same as the processing of steps #A1 to #A7, and steps #B1 to #B7 in FIGS. 6A and 6B according to the first embodiment, and the time chart in the asynchronous control mode is the same as the time chart shown in FIG. 7 according to the first embodiment. Therefore, description about the asynchronous control mode according to the present embodiment will be omitted because the description is the same as that of the first embodiment.

If the present control mode is the synchronous control mode (step #22: No) and the standard calculation cycle T0 is executed an odd number of times (step #24: Yes), the control device 2 performs the processing operations according to the processing cycle settings for the synchronous control mode while giving priority to the processing for the first electric motor MG1, as shown in the first standard calculation cycle T01 and the third standard calculation cycle T03 of FIG. 13. First, the magnetic pole position take-in processing PT1 and the current value take-in processing IT1 are performed (step #I1) in which the magnetic pole position θ and the current detection values Iur, Ivr, and Iwr of the first electric motor MG1 detected first in the standard calculation cycle T0 are taken in after being converted into digital data by the A/D converter 67 (refer to FIG. 1). Next, the three-phase/two-phase conversion processing CT1 (step #I2), the current control processing IC1 (step #I3), the modulation factor and voltage command phase deriving processing MC1 (step #I4), and the voltage control processing VC1 (step #I5) are sequentially performed for the first electric motor MG1. Here, regarding the voltage control processing VC1 for the first electric motor MG1 in the odd numbered standard calculation cycle T0, the voltage control processing VC1 is performed based on the two-phase voltage command values Vd and Vq in which the current detection values Idr and Iqr for two (=N) times are reflected in integral terms by the current control processing IC1 repeated twice (=N times), one in the standard calculation cycle T0 during which the voltage control processing VC1 is executed and the other in the previous even numbered standard calculation cycle T0 (for example, in the second standard calculation cycle T02 relative to the third standard calculation cycle T03 in FIG. 13), for the first electric motor MG1. Consequently, the voltage control processing VC1 is performed once by feeding back the current detection values Idr and Iqr for two (=N) times.

Subsequently, the magnetic pole position take-in processing PT2 and the current value take-in processing IT2 are performed (step #I6) in which the magnetic pole position θ and the current detection values Iur, Ivr, and Iwr of the second electric motor MG2 detected first in the standard calculation cycle T0 are taken in after being converted into digital data by the A/D converter 67. Next, the three-phase/two-phase conversion processing CT2 (step #I7) and the current control processing IC2 (step #I8) are sequentially performed for the second electric motor MG2. The current control processing IC2 for the second electric motor MG2 is performed in the odd numbered standard calculation cycle T0 in order to reflect the current detection values Iur, Ivr, and Iwr of the second electric motor MG2 detected first in the odd numbered standard calculation cycle T0 to the integral terms of the voltage command values Vd and Vq obtained as results of the current control processing IC2.

If the present control mode is the synchronous control mode (step #22: No) and the standard calculation cycle T0 is an even numbered cycle (step #24: No), the control device 2 performs the processing operations according to the processing cycle settings for the synchronous control mode while giving priority to the processing for the second electric motor MG2, as shown in the second standard calculation cycle T02 and the fourth standard calculation cycle T04 of FIG. 13. First, the magnetic pole position take-in processing PT2 and the current value take-in processing 1T2 are performed (step #J1) in which the magnetic pole position θ and the current detection values Iur, Ivr, and Iwr of the second electric motor MG2 detected first in the standard calculation cycle T0 are taken in after being converted into digital data by the A/D converter 67 (refer to FIG. 1). Next, the three-phase/two-phase conversion processing CT2 (step #J2), the current control processing IC2 (step #J3), the modulation factor and voltage command phase deriving processing MC2 (step #J4), and the voltage control processing VC2 (step #J5) are sequentially performed for the second electric motor MG2. Here, regarding the voltage control processing VC2 for the second electric motor MG2 in the even numbered standard calculation cycle T0, the voltage control processing VC2 is performed based on the two-phase voltage command values Vd and Vq in which the current detection values Idr and Iqr for two (=N) times are reflected in integral terms by the current control processing IC2 repeated twice (=N times), one in the standard calculation cycle T0 during which the voltage control processing VC2 is executed and the other in the previous odd numbered standard calculation cycle T0 (for example, in the first standard calculation cycle T01 relative to the second standard calculation cycle T02 in FIG. 13), for the second electric motor MG2. Consequently, the voltage control processing VC2 is performed once by feeding back the current detection values Idr and Iqr for two (=N) times.

Subsequently, the magnetic pole position take-in processing PT1 and the current value take-in processing IT1 are performed (step #J6) in which the magnetic pole position θ and the current detection values Iur, Ivr, and Iwr of the first electric motor MG1 detected first in the standard calculation cycle T0 are taken in after being converted into digital data by the A/D converter 67. Next, the three-phase/two-phase conversion processing CT1 (step #J7) and the current control processing IC1 (step #J8) are sequentially performed for the first electric motor MG1. The current control processing IC1 for the first electric motor MG1 is performed in the even numbered standard calculation cycle T0 in order to reflect the current detection values Iur, Ivr, and Iwr of the first electric motor MG1 detected first in the even numbered standard calculation cycle T0 in integral terms of the voltage command values Vd and Vq obtained as results of the current control processing IC1.

As described above, if the synchronous control mode is selected, the voltage control processing VC (VC1 and VC2) is performed based on the two-phase voltage command values Vd and Vq in which the current detection values Idr and Iqr for two (=N) times are reflected in integral terms by the current control processing IC (IC1 and IC2) repeated twice (=N times). Accordingly, in the case of performing the voltage control processing VC (VC1 and VC2) in a relatively long cycle that is twice (=N times) longer than the standard calculation cycle T0 while performing the current detection processing IS (IS1 and IS2) in a short cycle of the standard calculation cycle T0, the voltage control processing VC (VC1 and VC2) can be performed by appropriately feeding back the current detection values for two (=N) times detected by repeating the current detection processing IS (IS1 and IS2) twice (=N times), Consequently, in the synchronous control mode in which the rotational speed of the rotor of the electric motor MG is relatively high and the aliasing in the current sampling tends to be liable to occur, the cycle (sampling cycle) of the current detection processing IS (IS1 and IS2) can be shortened, and the aliasing in the current sampling can be suppressed from occurring by appropriately reflecting in the control the current detection values detected in the short cycle.

Although the calculation load of the CPU core 62 increases by reducing the cycles of the current detection processing IS (IS1 and IS2) and the current control processing IC (IC1 and IC2) to be shorter than that in the asynchronous control mode, the calculation load required for the voltage control processing VC (VC1 and VC2) is reduced by a corresponding amount by extending the cycle of the voltage control processing VC (VC1 and VC2) to twice N times) that of the asynchronous control mode, thereby limiting the overall calculation load of the control device 2 within the processing capacity of the CPU core 62. Accordingly, even if the rotational speed of the electric motor MG is high, the aliasing in the current sampling can be suppressed from occurring while using the CPU core 62 with a limited processing capacity.

4. Fourth Embodiment

Next, a fourth embodiment of the control device 2 of the electric motor drive apparatus 1 according to the present invention will be described. The structure of the control device 2 according to the present embodiment, although basically similar to that of the third embodiment, differs from that of the third embodiment in that only one electric motor MG is provided as a controlled object. Therefore, although illustration is omitted, the hardware structure differs from that of the third embodiment in that the electric motor drive apparatus 1 is provided with one inverter 6, one current sensor 7, and one rotation sensor 8. In addition, the software structure differs from that of the third embodiment in that the control device 2 is structured so as to control one electric motor MG. Note that, in the present embodiment, the processing cycles of the units and the procedures of the electric motor control processing in the asynchronous control mode are the same as those of the second embodiment. Accordingly, the description of the present embodiment uses FIG. 10 as a time chart for showing the processing cycles of the units in the asynchronous control mode. The description will be made below of the processing cycle of each of the units depending on the control mode and of the procedures of the electric motor control processing that are the main points of difference. Note that the points not particularly described are basically the same as those of the third embodiment.

4-1. Processing Cycle of Each Unit Depending on Control Mode

First, description will be made of setting of the processing cycle of each of the units of the control device 2 depending on the control mode according to the present embodiment. In the present embodiment, the control device 2 is structured so as to perform the calculation processing for the current feedback control of the single electric motor MG with the single CPU core 62. Accordingly, if the asynchronous control mode is selected, the control device 2 performs the voltage control processing VC in every standard calculation cycle T0, and also performs the current detection processing IS in a cycle of twice (=N times) longer than the standard calculation cycle T0, thus performing the voltage control processing VC twice (=N times) by feeding back the current detection values Iur, Ivr, and Iwr detected by performing the current detection processing IS once, as shown in FIG. 10. On the other hand, if the synchronous control mode is selected, the control device 2 performs the current detection processing IS in every standard calculation cycle T0, and also performs the voltage control processing VC in a cycle of twice (=N times) longer than the standard calculation cycle T0, thus performing the voltage control processing VC once by feeding back the current detection values Iur, Ivr, and Iwr for two (=N) times detected by repeating the current detection processing IS twice (=N times), as shown in FIG. 15. Note that, in FIGS. 10 and 15, the current detection cycle at which the current detection processing IS is performed is indicated as "T1" and the voltage control cycle at which the voltage control processing VC is performed is indicated as "T2", in addition to the carrier cycle TC and the standard calculation cycle T0.

The control device 2 also switches the cycles of other processing operations corresponding to switching of the current detection cycle T1 and the voltage control cycle T2. Specifically, in the same manner as in the third embodiment, the current value take-in processing IT and the three-phase/two-phase conversion processing CT are performed after the current detection processing IS at the same cycle as that of the current detection processing IS. That is, if the asynchronous control mode is selected, the control device 2 performs the current value take-in processing IT and the three-phase/two-phase conversion processing CT in a cycle of twice (=N times) longer than the standard calculation cycle T0, as shown in FIG. 10, whereas if the synchronous control mode is selected, the control device 2 performs the current value take-in processing IT and the three-phase/two-phase conversion processing CT in every standard calculation cycle T0, as shown in FIG. 15.

In addition, in the same manner as in the third embodiment, the control device 2 also switches the cycle of the current control processing IC corresponding to switching of the current detection cycle T1 and the voltage control cycle T2, that is, corresponding to the control mode. Specifically, the current control processing IC is performed after the three-phase/two-phase conversion processing CT in the same cycle as that of the current detection processing IS. Accordingly, if the asynchronous control mode is selected, the control device 2 performs the current control processing IC in a cycle of twice (=N times) longer than the standard calculation cycle T0, as shown in FIG. 10, whereas if the synchronous control mode is selected, the control device 2 performs the current control processing IC in every standard calculation cycle T0, as shown in FIG. 15. Here, the two-phase voltage command values Vd and Vq derived by the current control processing IC include, as integral terms of the integral control, values depending on an integral gain and the integral values of deviations between the current detection values Idr and Iqr, and the current command values Id and Iq for a plurality of times. If the synchronous control mode is selected, the voltage control processing VC is performed once whereas the current control processing IC is performed twice. Therefore, the voltage control processing VC is performed based on the two-phase voltage command values Vd and Vq in which the current detection values Idr and Iqr for two (=N) times are reflected in integral terms by the current control processing IC repeated twice (=N times). Consequently, the voltage control processing VC can be performed by appropriately feeding back the current detection values Idr and Iqr for two (=N) times. The present embodiment is the same as the third embodiment in this respect.

As shown in FIGS. 10 and 15, the magnetic pole position detection processing PS and the magnetic pole position take-in processing PT are performed in every standard calculation cycle T0 regardless of the control mode. The modulation factor and voltage command phase deriving processing MC is performed in a cycle of twice (=N times) longer than the standard calculation cycle T0 regardless of the control mode. Thus, the cycles of the processing operations are basically the same as those of the first embodiment.

In the present embodiment, there are also processing operations to be performed in a cycle of twice (=N times) longer than the standard calculation cycle T0 in the same manner as in the third embodiment. Those processing operations are performed once in every two standard calculation cycles T0. Therefore, also in the present embodiment, the control device 2 monitors whether the standard calculation cycle T0 is repeated an odd number of times or an even number of times, and, for example, performs the processing to be performed in a cycle of twice (=N times) longer than the standard calculation cycle T0 in the odd numbered cycle, but does not perform such processing in the even numbered cycle, depending on the monitoring result. The control device 2 performs the processing to be performed in every standard calculation cycle T0, regardless of whether the cycle is executed an odd number of times or an even number of times.

4-2. Procedures of Electric Motor Control Processing

Next, procedures of the electric motor control processing according to the present embodiment will be described with reference to a flow chart in FIG. 14 and the time charts in FIGS. 10 and 15. Also in the present embodiment, the calculation processing in each of the functional units of the control device 2 is performed based on the standard calculation cycle T0 serving as the cycle of the interrupt processing by the CPU 61. In addition, the magnetic pole position detection processing PS is performed in every standard calculation cycle T0, regardless of the control mode. On the other hand, the current detection processing IS is performed in a cycle of twice (=N times) longer than the standard calculation cycle T0 if the asynchronous control mode is selected, or in every standard calculation cycle T0 if the synchronous control mode is selected.

As shown in FIG. 14, after the interrupt processing of the CPU 61 in every standard calculation cycle T0 is executed (step #31), the control device 2 first determines whether the present control mode determined by the mode determination unit 51 is the asynchronous control mode or the synchronous control mode (step #32), and then determines whether the standard calculation cycle T0 is repeated an odd number of times or an even number of times (step #33 or #34). If the present control mode is the asynchronous control mode (step #32: Yes), the processing cycles of the units and the procedures of the electric motor control processing are the same as those of the second embodiment. Accordingly, the processing of steps #K1 to #K6 in the flow chart of FIG. 14 is the same as the processing of steps #E1 to #E6 in FIG. 9 according to the second embodiment, and the time chart in the asynchronous control mode is the same as the time chart shown in FIG. 10 according to the second embodiment. Therefore, description about the asynchronous control mode according to the present embodiment will be omitted because the description is the same as that of the second embodiment.

If the present control mode is the synchronous control mode (step #32: No) and the standard calculation cycle T0 is executed an odd number of times (step #34: Yes), the control device 2 performs both the processing to be performed in a cycle of twice (=N times) longer than the standard calculation cycle T0 and the processing to be performed in every standard calculation cycle T0 according to the processing cycle settings for the synchronous control mode, as shown in the first standard calculation cycle T01 and the third standard calculation cycle T03 of FIG. 15. First, the magnetic pole position take-in processing PT and the current value take-in processing IT are performed (step #L1) in which the magnetic pole position θ and the current detection values Iur, Ivr, and Iwr of the electric motor MG detected first in the standard calculation cycle T0 are taken in after being converted into digital data by the A/D converter 67 (refer to FIG. 1). Next, the three-phase/two-phase conversion processing CT (step #L2), the current control processing IC (step #L3), the modulation factor and voltage command phase deriving processing MC (step #L4), and the voltage control processing VC (step #L5) are sequentially performed. Here, regarding the voltage control processing VC for the electric motor MG in the odd numbered standard calculation cycle T0, the voltage control processing VC is performed based on the two-phase voltage command values Vd and Vq in which the current detection values Idr and Iqr for two (=N) times are reflected in integral terms by the current control processing IC repeated twice (=N times), one in the standard calculation cycle T0 during which the voltage control processing VC is executed and the other in the previous even numbered standard calculation cycle T0 (for example, in the second standard calculation cycle T02 relative to the third standard calculation cycle T03 in FIG. 15). Consequently, the voltage control processing VC is performed once by feeding back the current detection values Idr and Iqr for two (=N) times.

If the present control mode is the synchronous control mode (step #32: No) and the standard calculation cycle T0 is executed an even number of times (step #34: No), the control device 2 performs only the processing to be performed in every standard calculation cycle T0 according to the processing cycle settings for the synchronous control mode, as shown in the second standard calculation cycle T02 and the fourth standard calculation cycle T04 of FIG. 15. First, the magnetic pole position take-in processing PT and the current value take-in processing IT are performed (step #L6) in which the magnetic pole position θ and the current detection values Iur, Ivr, and Iwr of the electric motor MG detected first in the standard calculation cycle T0 are taken in after being converted into digital data by the A/D converter 67 (refer to FIG. 1). Next, the three-phase/two-phase conversion processing CT (step #L7) and the current control processing IC (step #L8) are sequentially performed. The current control processing IC is performed in the even numbered standard calculation cycle T0 in order to reflect the current detection values Iur, Ivr, and Iwr detected first in the even numbered standard calculation cycle T0 in the integral terms of the voltage command values Vd and Vq obtained as results of the current control processing IC.

Also in the present embodiment, in the same manner as in the third embodiment, by employing the structure as described above, the cycle (sampling cycle) of the current detection processing IS can be shortened, and the aliasing in the current sampling can be suppressed from occurring by appropriately reflecting the current detection values detected at the short cycle to the control, in the synchronous control mode in which the rotational speed of the rotor of the electric motor MG is relatively high and the aliasing in the current sampling tends to be liable to occur. Although the calculation load of the CPU core 62 is increased by reducing the cycle of the current detection processing IS to be shorter than that in the asynchronous control mode, the corresponding amount of the increase in the calculation load is reduced by extending the cycle of the voltage control processing VC to twice (=N times) that of the asynchronous control mode, thereby limiting the overall calculation load of the control device 2 within the processing capacity of the CPU core 62.

5. Other Embodiments (1) In the embodiments described above, description has been made of the examples where the mode determination unit 51 can select, as the synchronous control mode, the third control mode in which the rectangular-wave control is performed, and also can select, as the asynchronous control mode, either the first control mode in which the sine-wave PWM control is performed or the second control mode in which the overmodulation PWM control is performed. However, embodiments of the present invention are not limited to these examples. For example, in addition to the rectangular-wave control (one-pulse control) in which the on/off operation of each of the switching elements is performed once in one cycle of the electric angle and one pulse is output in a half cycle of the electric angle, the synchronous control mode includes M-pulse control (for example, three-pulse control or five-pulse control) in which the on/off operation of each of the switching elements is performed M times (where M is an integer of two or more) in one cycle of the electric angle. The M-pulse control is control in which M pulses are output in a half cycle of the electric angle, where the width of each pulse is predetermined depending on the phase of the electric angle. Note, however, that the widths of the M pulses output in the half cycle of the electric angle may be set so as to be different from or equal to each other. The mode determination unit 51 is also suitably structured to select one of these multiple types of the synchronous control mode. In addition, the asynchronous control mode includes various types of control mode in which the cycle of the electric angle of the electric motor MG is not synchronized with the switching cycle of the inverter 6 and the switching control signals Pu, Nu, Pv, Nv, Pw, and Nw for the inverter 6 are generated based on the carrier. The asynchronous control mode as described above includes various types of the PWM control such as two-phase modulation PWM control and space vector PWM control, in addition to the sine-wave PWM control and the overmodulation PWM control. The asynchronous control mode in the present invention also includes other control methods than the PWM control as far as the cycle of the electric angle of the electric motor MG is not synchronized with the switching cycle of the inverter 6 in those control methods.

(2) In the embodiments described above, description has been made of the examples where "N" in the present invention is two, and therefore, the cycle of processing at a longer cycle than the standard calculation cycle T0 is twice the standard calculation cycle T0. However, embodiments of the present invention are not limited to these examples. It is also one of preferable embodiments of the present invention to set N to a larger integer than two, such as three, four, or five. For example, if N is set to four, in the synchronous control mode, the control device 2 performs the current detection processing IS in every standard calculation cycle T0, and also performs the voltage control processing VC in a cycle of four times longer than the standard calculation cycle T0, thus performing the voltage control processing VC once by feeding back the current detection values for four times detected by repeating the current detection processing IS four times. In the asynchronous control mode, the control device 2 performs the voltage control processing VC in every standard calculation cycle T0, and also performs the current detection processing IS in a cycle of four times longer than the standard calculation cycle T0, thus performing the voltage control processing VC four times by feeding back the current detection values detected by performing the current detection processing IS once.

(3) In the embodiments described above, description has been made of the examples where one or two of the alternating-current electric motors MG are used as controlled objects. However, embodiments of the present invention are not limited to these examples. It is also one of preferable embodiments of the present invention to structure the control device 2 so as to control more than two, such as three or four, of the alternating-current electric motors MG. In any case, the electric motor drive apparatus 1 is structured to have the plurality of inverters 6 to drive-control the plurality of alternating-current electric motors MG, and the control device 2 is structured so as to control the alternating-current electric motors MG by controlling the plurality of inverters 6. Here, although the number of the alternating-current electric motors MG is preferably be the same as "N" of the present invention for determining the cycle of processing in a longer cycle than the standard calculation cycle T0, the number of the electric motors may be different from N.

(4) In the embodiments described above, description has been made of the examples where the present invention is applied to the control device 2 of the electric motor drive apparatus 1 that controls the electric motors MG used as a source of driving force of an electric vehicle or a hybrid vehicle. However, the applicable scope of the present invention is not limited to these examples. That is, the present invention can be applied to control any device or equipment that controls alternating-current electric motors.

The present invention can suitably be used for a control device that controls an electric motor drive apparatus having an inverter converting a direct-current voltage into an alternating-current voltage and supplying the alternating-current voltage to an alternating-current electric motor, and controls the alternating-current electric motor by current feedback.

What is claimed is:

1. A control device for an electric motor drive apparatus that controls an electric motor drive apparatus having an inverter converting a direct-current voltage into alternating-current voltages and supplying the alternating-current voltages to an alternating-current electric motor, and controls the alternating-current electric motor by current feedback, the control device for an electric motor drive apparatus comprising:
- a voltage control unit performing voltage control processing that determines alternating-current voltage command values serving as command values of the alternating-current voltages to be supplied to the alternating-current electric motor and generates switching control signals for the inverter; and
- a control mode selection unit selecting a synchronous control mode in which a cycle of electric angle of the alternating-current electric motor is synchronized with a switching cycle of the inverter, or an asynchronous control mode in which the cycles are not synchronized with each other, wherein
- current detection processing is performed to detect currents flowing in coils of the alternating-current electric motor in every standard calculation cycle that is set to a half of a cycle of the carrier, the voltage control processing is performed in a cycle of N times (where N is an integer of two or more) longer than the standard calculation cycle, and the voltage control processing is performed once by feeding back the current detection values for N times detected by repeating the current detection processing N times, if the synchronous control mode is selected.

2. The control device for an electric motor drive apparatus according to claim 1, wherein the voltage control processing is performed in each of the standard calculation cycles, the current detection processing is performed in the cycle of N times longer than the standard calculation cycle, and the voltage control processing is performed N times by feeding back the current detection values detected by performing the current detection processing once, if the asynchronous control mode is selected.

3. The control device for an electric motor drive apparatus according to claim 1, further comprising:
- a current control unit performing current control processing that determines first voltage command values based on deviations between current command values determined based on a required torque of the alternating-current electric motor and the current detection values detected by the current detection processing; and
- an average value calculation unit performing average value calculation that calculates average values of the current detection values for N times detected by repeating the current detection processing N times, wherein
- the average value calculation and the current control processing, as well as the voltage control processing, are performed in the cycle of N times longer than the standard calculation cycle, if the synchronous control mode is selected, and
- the current control unit determines the first voltage command values by performing the current control processing based on deviations between the current command values and the average values calculated by the average value calculation unit, and the voltage control unit performs the voltage control processing based on the first voltage command values.

4. The control device for an electric motor drive apparatus according to claim 1, further comprising:
- a current control unit performing current control processing that determines first voltage command values at least by performing proportional control and integral control based on deviations between current command values determined based on a required torque of the alternating-current electric motor and the current detection values detected by the current detection processing, wherein
- the current control processing, as well as the current detection processing, is performed in each of the standard calculation cycles, if the synchronous control mode is selected, and
- the voltage control unit performs the voltage control processing based on the first voltage command values having integral terms in which the current detection values for N times are reflected by the current control processing repeated N times.

5. The control device for an electric motor drive apparatus according to claim 1, wherein
- the calculation processing for the current feedback control of N pieces of the alternating-current electric motors is performed by a single calculation processing unit, and
- the current detection processing for each of the N alternating-current electric motors is performed in each of the standard calculation cycles, and the voltage control processing for each of the N alternating-current electric motors is performed in the cycle of N times longer than the standard calculation cycle in the mutually different standard calculation cycles, if the synchronous control mode is selected.

6. The control device for an electric motor drive apparatus according to claim 5, wherein
- the voltage control processing for each of the N alternating-current electric motors is performed in each of the standard calculation cycles sequentially in the same standard calculation cycle, the current detection processing for each of the N alternating-current electric motors is performed in the cycle of N times longer than the standard calculation cycle at mutually different times, and the voltage control processing is performed N times by feeding back the current detection values detected by performing the current detection processing once for each of the N alternating-current electric motors, if the asynchronous control mode is selected.

* * * * *